(12) United States Patent
Velarde et al.

(10) Patent No.: US 8,830,339 B2
(45) Date of Patent: Sep. 9, 2014

(54) AUTO-TRIGGERED FAST FRAME RATE DIGITAL VIDEO RECORDING

(75) Inventors: Ruben M. Velarde, Chula Vista, CA (US); Szepo Robert Hung, Carlsbad, CA (US)

(73) Assignee: QUALCOMM Incorporated, San Diego, CA (US)

(*) Notice: Subject to any disclaimer, the term of this patent is extended or adjusted under 35 U.S.C. 154(b) by 975 days.

(21) Appl. No.: 12/424,309

(22) Filed: Apr. 15, 2009

(65) Prior Publication Data

US 2010/0265344 A1    Oct. 21, 2010

(51) Int. Cl.
| | |
|---|---|
| H04N 5/225 | (2006.01) |
| H04N 5/228 | (2006.01) |
| H04N 5/76 | (2006.01) |
| H04N 5/783 | (2006.01) |
| H04N 5/232 | (2006.01) |
| H04N 9/804 | (2006.01) |

(52) U.S. Cl.
CPC .............. *H04N 5/232* (2013.01); *H04N 9/8042* (2013.01); *H04N 5/783* (2013.01)
USPC ................. 348/220.1; 348/208.16; 348/231.9

(58) Field of Classification Search
USPC ................. 348/208.99, 208.16, 222.1, 220.1, 348/207.99, 154, 157, 135, 37–39, 218.1, 348/231.9
See application file for complete search history.

(56) References Cited

U.S. PATENT DOCUMENTS

| | | | | |
|---|---|---|---|---|
| 7,116,353 | B2* | 10/2006 | Hobson et al. | 348/150 |
| 7,546,026 | B2* | 6/2009 | Pertsel et al. | 396/52 |
| 7,903,168 | B2* | 3/2011 | Pillman et al. | 348/345 |
| 2001/0052131 | A1* | 12/2001 | Hobson et al. | 725/105 |
| 2003/0128766 | A1* | 7/2003 | Tahara et al. | 375/240.26 |
| 2003/0174772 | A1* | 9/2003 | Voronov et al. | 375/240.06 |
| 2004/0136596 | A1* | 7/2004 | Oneda et al. | 382/232 |
| 2005/0099494 | A1* | 5/2005 | Deng et al. | 348/36 |

* cited by examiner

*Primary Examiner* — Ahmed A Berhan
(74) *Attorney, Agent, or Firm* — Steven Thiel; Elaine H. Lo

(57) ABSTRACT

This disclosure describes techniques for triggering recording of digital video in a fast frame rate mode. In one example, a digital video recording apparatus includes a video sensor that captures digital video data at a fast frame rate in a fast frame rate mode, a video buffer that buffers the captured digital video data according to a first-in-first-out storage schema, a video storage that stores digital video data, and a motion detection unit that detects fast motion in the buffered digital video data, that stores digital video data from the video sensor in the video storage after detecting the fast motion, and that copies the contents of the video buffer to the video storage prepended to the stored video data. The digital video recording apparatus may be incorporated in a wireless communication device, such as a cellular phone.

38 Claims, 9 Drawing Sheets

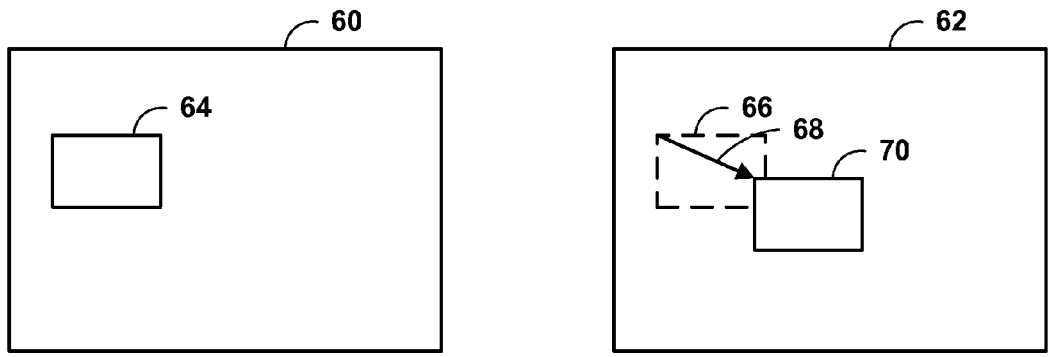
FIG. 3A
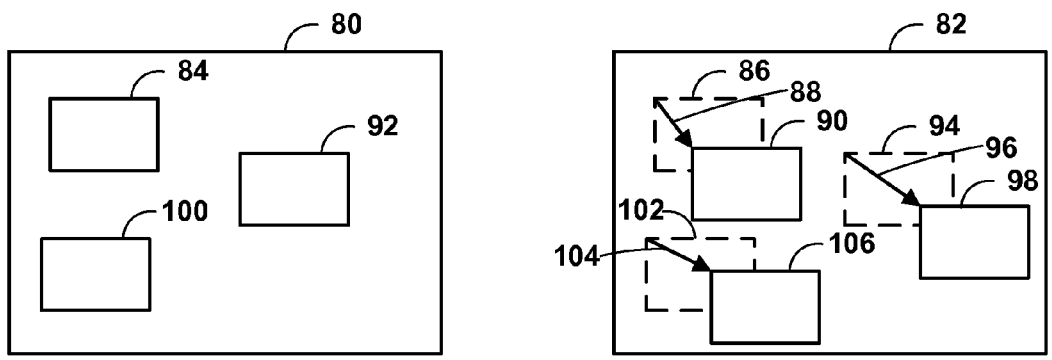
FIG. 3B
FIG. 3C

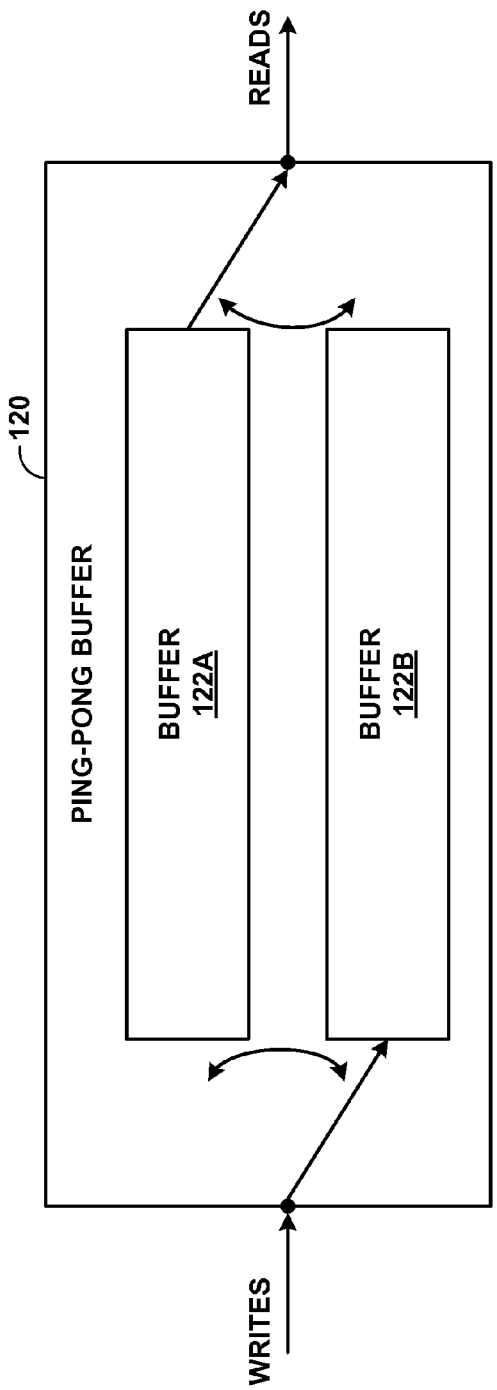
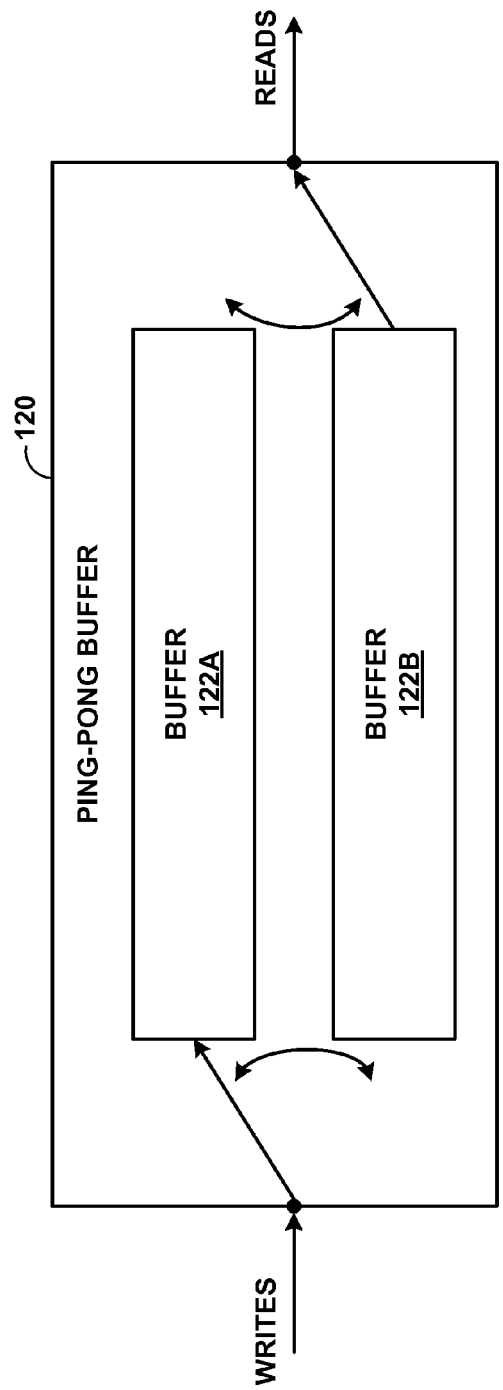
FIG. 4A
FIG. 4B

AUTO-TRIGGERED FAST FRAME RATE DIGITAL VIDEO RECORDING

TECHNICAL FIELD

This disclosure relates to digital video recording and, more particularly, to recording digital video at a fast frame rate.

BACKGROUND

Image capture devices, such as digital video cameras or digital still cameras, are used in different applications and environments. For example, video cameras may be used to capture video scenes with fast motion or rapidly changing scenes, such as sporting events, vehicles in motion, a bird in flight, or the like. At normal frame rates, e.g., 15 frames per second (fps) or 30 fps, a rapid change may be reproduced as a blur or may be missed. Video cameras may be designed to record at a fast frame rate, such as greater than 30 fps (e.g., 60 fps or 120 fps), such that a fast motion scene can be displayed in slow motion, e.g., at 30 fps or 15 fps, thereby showing more motion details of objects.

Recording at fast frame rates may present several challenges. As an example, recording video at a fast frame rate generally requires greater storage capacity, e.g., a relatively high amount of memory and/or storage space. Hence, in some cases, the fast frame rate mode may be subject to a time-limited recording interval due to memory limitations or other implementation considerations. With a limited recording interval for fast frame rate recording, it may not be possible to start recording substantially in advance of a motion event. For example, if fast frame recording is started earlier, the recording interval expires earlier, possibly limiting the amount of actual motion that can be recorded.

An operator of a video camera may attempt to manually start recording at a fast frame rate just before the onset or during the course of fast motion or a scene change. For example, the operator may attempt to press "record" just before the kick of a football, a bird takes flight, a balloon bursts, a car passes, or a golfer begins the backswing. However, this method relies on the reflexes of the camera operator, and the responsiveness of the camera to the manual input, either of which may result in a fast motion or scene change event being missed partially or entirely in the recorded video.

SUMMARY

In general, this disclosure describes techniques for automatically triggering the start of fast frame rate video recording in a digital video recording device based on detection of motion or scene change. A digital video recording device may record at a fast frame rate to record video of motion or a scene change. By recording at a fast frame rate, such as greater than 30 fps, e.g., 60 fps or 120 fps, the recorded video can later be displayed for playback at a slower frame rate, e.g., 30 fps or lower, to show the fast motion or scene change in slow motion. The digital video recording device may begin recording at the fast frame rate upon detecting motion or a scene change in a video scene.

In one example, the disclosure provides a method comprising buffering digital video data captured by a video sensor in a video data buffer, detecting motion or a scene change in the buffered digital video data, recording at least a portion of the buffered digital video data in a data storage device in response to the detection of motion or a scene change, and recording digital video data newly captured from the video sensor in the data storage device in response to the detection of motion or a scene change.

In another example, the disclosure provides an apparatus comprising a video sensor that captures digital video data, a video data buffer that buffers the captured digital video data, a detection unit that detects motion or a scene change in the buffered digital video data, and a video recording unit that records at least a portion of the buffered digital video data in a data storage device in response to the detection of motion or a scene change, and records digital video data newly captured by the video sensor in the data storage device in response to the detection of motion or a scene change.

In another example, the disclosure provides an apparatus comprising means for buffering digital video data captured by a video sensor in a video data buffer, means for detecting motion or a scene change in the buffered digital video data, means for recording at least a portion of the buffered digital video data in a data storage device in response to the detection of motion or a scene change, and means for recording digital video data newly captured from the video sensor in the data storage device in response to the detection of motion or a scene change.

In another example, the disclosure provides a computer-readable medium encoded with instructions for causing a programmable processor to buffer digital video data captured by a video sensor in a video data buffer, detect motion or a scene change in the buffered digital video data, record at least a portion of the buffered digital video data in a data storage device in response to the detection of motion or a scene change, and record digital video data newly captured from the video sensor in the data storage device in response to the detection of motion or a scene change.

The details of one or more examples are set forth in the accompanying drawings and the description below. Other features, objects, and advantages will be apparent from the description and drawings, and from the claims.

BRIEF DESCRIPTION OF DRAWINGS

FIGS. 3A-3C are conceptual diagrams illustrating examples of consecutive video data units from which a motion detection unit may attempt to detect motion or scene change.

FIGS. 4A and 4B are conceptual diagrams illustrating an example ping-pong buffer for use in buffering pre-trigger video data.

DETAILED DESCRIPTION

Figure 1:
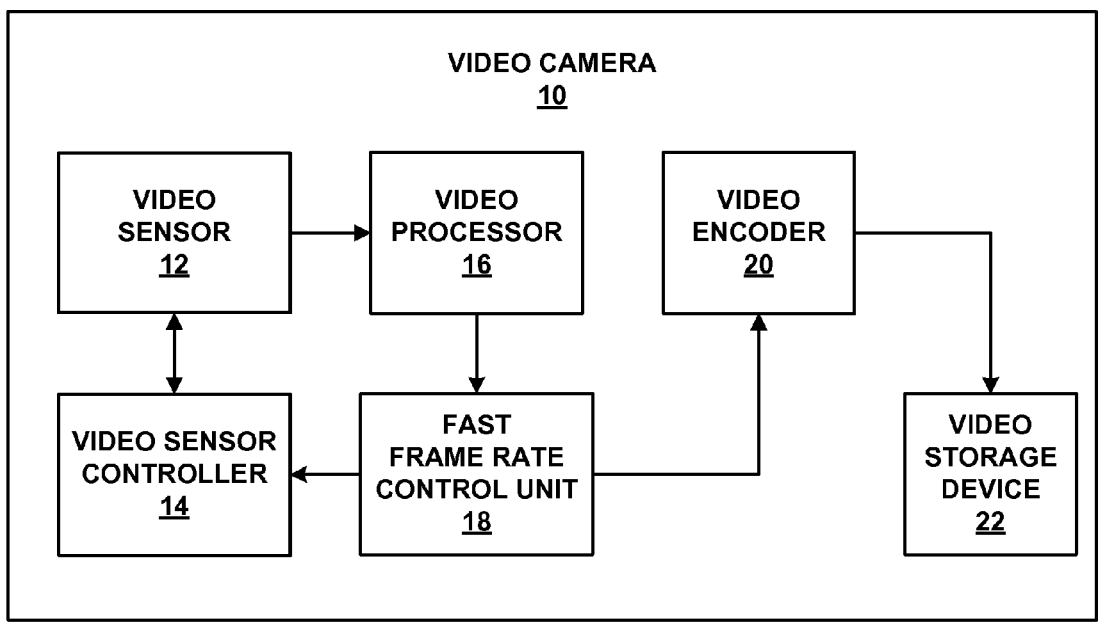
FIG. 1 is a block diagram illustrating an example video camera for capturing digital video data at a fast frame rate in response to an automatic trigger based on detection of motion or a scene change.

This disclosure describes techniques for automatically triggering the start of fast frame rate video recording in a digital video recording device based on detection of a motion event or scene change event in a captured video scene. The digital video recording device may begin recording at the fast frame rate upon detecting motion or scene change in the video scene. The digital video recording device may be configured to capture video at a fast frame rate, and temporarily store the captured video in a running video data buffer for selective recording. Upon detecting a predetermined degree of motion in the video scene, or upon detecting a scene change, the digital video recording device may be automatically triggered to begin recording post-trigger video data and prepend the pre-trigger buffered video data from the running buffer with the post-trigger, newly captured recorded video data.

The prepended video data from the buffer may include video associated with one or more video frames captured prior to a detected motion or scene change event in the video scene. In some cases, the prepended video data from the buffer may include a number of frames sufficient to support a desired playback time, e.g., one second, in advance of a detected motion or scene change event. In this manner, the digital video recording device may capture the beginning of a fast motion or scene change event in the video scene. In particular, the digital video recording device may record the beginning of the fast motion or scene change event automatically without relying on the reflexes of a user or the response time of the digital video recording device. In addition, in some examples, the beginning of the fast motion or scene change event may be recorded without the need to record and store in memory a long segment of video data in advance of the fast motion or scene change event, avoiding premature expiration of limited recording intervals, if applicable.

Techniques for automatically triggering the start of fast frame video recording, as described in this disclosure, may rely on any of a variety of different motion or scene change detection techniques, such as techniques involving analysis of motion vector data, pixel difference data, transform domain data, or the like. The motion or scene change detection techniques may detect an amount of motion, a speed of motion, and/or a scene change within a captured video scene. When the amount and/or speed of motion exceeds a predetermined threshold value, and/or a scene change is detected, the motion detection techniques may automatically trigger the start of fast frame video recording. With automatic triggering and pre-trigger buffering, the digital video recording device can record at a fast frame rate without missing the window of opportunity to start recording. Recording a period of time prior to motion or scene change detection using a running buffer of frames may provide the user with a feel that none of the action has been missed.

FIG. 1 is a block diagram illustrating an example digital video recording device for capturing video information from a scene. In the example of FIG. 1, the digital video recording device includes a digital video camera 10. The digital video recording device may be referred to, alternatively, as a video recording apparatus. According to the techniques described in this disclosure, video camera 10 may sense video from a video scene to generate digital video data, and temporarily buffer the video data in a memory buffer. In response to a record trigger, video camera 10 records the buffered video data in a video storage device. In particular, video camera 10 may record buffered video data that was received before the trigger in the data storage device, and record buffered video data that was received after the trigger in the data storage device.

The trigger may be an automatic fast frame rate trigger that is generated based on detection of motion or a scene change within a video scene. In general, as mentioned above, the trigger may be generated in response to detection of fast motion or a scene change using motion vector data, difference data, transform domain data, or the like. Motion vector data, difference data, transform domain data may indicate significant differences between successive video frames, which may result from motion or scene change. Examples of motion and scene change include movement of an object, introduction of a new object into a scene, a significant brightness change, a significant color change, or other differences between two frames, either in the pixel domain, the transform domain or otherwise. In response to the fast frame rate trigger, video camera 10 stores at least some of the pre-trigger contents of the running buffer in a video storage device along with the post-trigger, newly captured contents of the running buffer in the long-term in the video storage device. The running buffer may hold a limited quantity of video data and operate according to a first-in-first-out (FIFO) storage scheme, such that fast frame rate video is temporarily stored in the buffer so that it may be used to support fast frame rate recording, if fast motion is detected. The pre-trigger and post-trigger video data from the buffer may be encoded before storage in the video storage device.

As shown in the example of FIG. 1, video camera 10 may include a video sensor 12, a video sensor controller 14, a video processor 16, a fast frame rate control unit 18, a video encoder 20, and video storage device 22. The components included in video camera 10 and illustrated in FIG. 1 may be realized by any suitable combination of hardware, firmware and/or software components. In the illustrated example, the components are depicted as separate units. However, in other examples, any of the components may be integrated into combined units within common hardware, firmware, and/or software. Video camera 10 may comprise a stand-alone video recording device or may be incorporated into another device, such as a wireless communication device or a personal digital assistant (PDA).

Figure 7:
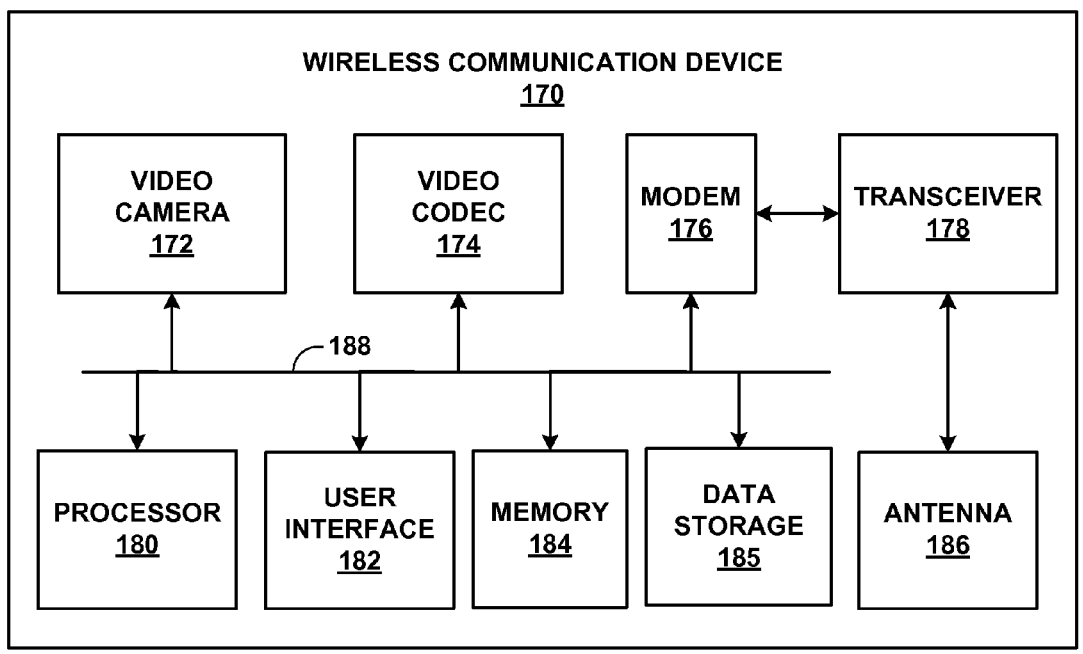
FIG. 7 is a block diagram illustrating an example wireless communication device including a video camera as described in this disclosure.

Video camera 10 may comprise a digital still camera in addition to a digital video camera. In addition, video camera 10 may be a stand-alone device, such as a stand-alone camera, or be integrated in another apparatus, such as a wireless communication device. As an example, video camera 10 may be integrated in a mobile wireless telephone to form a so-called camera phone or video phone, e.g., as illustrated in FIG. 7. Video camera 10 preferably is equipped to capture color imagery, black-and-white imagery, or both. In this disclosure, the terms "image," "imagery," "image information," or similar terms may interchangeably refer to either video or still pictures. Likewise, the term "frame" may refer to either a video frame or a still picture frame obtained by video camera 10. However, the disclosure will focus generally on fast frame rate recording of digital video.

Video sensor 12 may obtain light information from a scene prior to capturing a video frame of the scene. Video sensor 12 may include a two-dimensional array of individual image sensor elements, e.g., arranged in rows and columns. Video sensor 12 may comprise, for example, an array of solid state sensor elements such as complementary metal-oxide semiconductor (CMOS) sensors, or other sensor elements. The image sensor elements within video sensor 12 are exposed to the scene to obtain light information from the scene and to capture a video frame of the scene. The video frame may be characterized by an array of pixel values, which may have pixel intensity and color values.

Video sensor controller 14 may utilize the pixel information for preliminary visual front end (VFE) processing, such as automatic focus, automatic white balance and automatic exposure control. For example, video sensor controller 14 may perform automatic exposure based on the pixel information from video sensor 12 to select an exposure value (EV) that achieves a default target brightness for the video scene. The selected EV may define an aperture size to control the amount of light from the scene that reaches video sensor 12 and a shutter speed to control an amount of time that video sensor 12 is exposed to the light from the scene. In some examples, the functionality of fast frame rate control unit 18 may be incorporated into, or utilize, an existing automatic exposure unit or module. That is, an automatic exposure unit may, in some examples, be modified according to the techniques described in this disclosure to trigger recording at a fast frame rate upon detection of fast motion or a scene change.

Video sensor controller 14 also may cause video sensor 12 to capture video frames at one or more various frame rates. In one example, video sensor controller 14 causes video sensor 12 to capture video at a normal frame rate (e.g., 15 fps or 30 fps) and at a fast frame rate such as greater than 30 fps, e.g., 60 fps or 120 fps). In another example, video sensor controller 14 causes video sensor 12 to capture video at one of a plurality of frame rates. Fast frame rate control unit 18 sends a signal to video sensor controller 14 as to which frame rate to use. Fast frame rate control unit 18 may comprise a user interface, e.g., a button, a switch, a menu option, or other interface, that allows a user to select between frame rates, e.g., a normal frame rate and a fast frame rate. In one example, video camera 10 may comprise only a fast frame rate mode, such as a frame rate greater than 30 fps, e.g., 60 fps or 120 fps.

In a normal mode, e.g., 15 fps or 30 fps, video sensor controller 14 causes video sensor 12 to capture video at the normal frame rate after receiving a signal to begin recording, e.g., a user pressing a "record" input, such as a button. The record input may activate actual recording, or "arm" the camera to begin recording the next time the record button or another button is activated. Video sensor 12 sends captured video to video processor 16 for processing, such as filtering, cropping, demosaicing, image enhancement, or other processing of the video frame captured by video sensor 12. Video processor 16 may be realized by a microprocessor, digital signal processor (DSP), application specific integrated circuit (ASIC), field programmable gate array (FPGA), or any other equivalent discrete or integrated logic circuitry. Video processor 16 sends processed frames to video encoder 20 for video compression. Video encoder 20 may form part of an encoder-decoder (CODEC) that encodes the video frame according to a particular encoding technique or format, such as MPEG-2, MPEG-4, ITU H.263, ITU H.264, JPEG, or the like.

Video encoder 20 stores encoded video frames in video storage device 22. In another example, video processor 16 may store raw, non-encoded video frames directly in video storage device 22. If the imagery is accompanied by audio information, the audio also may be stored in video storage device 22, either independently or in conjunction with the video frames. Video storage device 22 may comprise any volatile or non-volatile memory or storage device, such as read-only memory (ROM), electrically erasable programmable read-only memory (EEPROM), or FLASH memory, or such as a magnetic data storage device or optical data storage device. Video data, and optionally audio data, recorded in video storage device 22 may be used to support playback on a display associated with video camera 10. Additionally, or alternatively, video data and optionally audio data recorded in video storage device 22 may be transferred to another device, such as a computer with display or a dedicated display device, for playback to a user on a display.

In a fast frame rate mode, such as greater than 30 fps (e.g., 60 fps or 120 fps), video sensor controller 14 causes video sensor 12 to capture video at the fast frame rate. Video sensor controller 14 may cause video sensor 12 to capture video at the fast frame rate before receiving a signal or trigger to begin recording. The trigger may be based on, for example, detection of motion or a scene change. Before the trigger, fast frame rate control unit 18 may store received video data in a running buffer, which may be provided within or be coupled to the fast frame rate control unit. In general, the buffer may store data in a first-in-first-out (FIFO) storage scheme. The buffer may be arranged according to a linked list, queue, array, circular array, or other data structure. In some cases, the buffer may be arranged as a ping-pong buffer having a first buffer and a second buffer that are written and read on an alternating basis with respect to one another. The buffer may be a dedicated hardware buffer or a buffer defined within general purpose memory. In some cases, video storage device 22 may provide longer term storage than the running buffer.

In one example, the buffer size may be determined by the time and the playback speed of the video. For example, the buffer may be of a size capable of storing 30 frames of video data, such that when the video data is played back at 30 fps, one second of data (i.e., 30 frames of data) is available. In another example, the buffer size may be determined according to the recording time of the video. For example, the buffer may be of a size capable of storing one second of video data at the fast frame rate, e.g., 60 frames for a 60 fps mode or 120 frames for a 120 fps mode. The buffer size may also be customized to accommodate other recording lengths, e.g., one-half second, two seconds, five seconds, etc. In each case, the buffer forms a running buffer of N frames, where N is selected to support a desired playback length, given the frame rate at which the frames are recorded. Hence, in some examples, a sufficient number of frames of the digital video data may be buffered to support at least one second of video playback time.

In general, fast frame rate control unit 18 may write data to the buffer until the buffer is full. Once the buffer is full, data may be written in a FIFO storage scheme, such that the buffer may operate as a running buffer that continuously overwrites old data with new data. That is, when the buffer is full and new data is written to the buffer, the oldest data may be discarded and overwritten with the new data. Fast frame rate control unit 18 may be configured generally to overwrite data in the buffer, without recording the data in data storage device 22, until a trigger to begin recording video data is received. As mentioned above, the trigger may be based on, for example, detection of motion or a scene change. In one example, fast frame rate control unit 18 may analyze two consecutive frames captured by video sensor 12 and stored in the buffer to identify motion between the two frames. The frames may be temporally contiguous in the sense that one follows temporally after the other. By applying contiguous frame analysis to determine if something in the captured video scene has moved or changed substantially, recording can be automatically triggered to more effectively record the movement or change.

When fast frame rate control unit 18 determines that motion or a scene change has occurred, fast frame rate control unit 18 automatically generates a trigger to begin recording. In response to the trigger, fast frame rate control unit 18 sends at least some of the pre-trigger video data from the buffer and newly received, post-trigger video data from the buffer to be stored in video storage device 22. Hence, fast frame rate control unit 18 may buffer digital video digital video data in a fast frame mode, records at least a portion of the buffered digital video data in the fast frame mode, and records newly captured digital video data in the fast frame mode.

Such video data may be stored as raw digital video data in some implementations. In other implementations, however, the pre-trigger and post-trigger video data may be sent to video encoder 20, which then encodes the received video data and stores encoded video data in video storage 22. Video encoder 20 may encode the video data according to any of a variety of coding techniques such as those defined by the MPEG-2, MPEG-4, ITU H.263, ITU H.264, or JPEG standards, or other standards. Hence, fast frame rate control unit 18 sends the contents of the buffer to video encoder 20 to be encoded and stored in video storage device 22. In this manner, post-trigger data written to the buffer after the detection of motion, as well as the pre-trigger written to the video buffer before the detection of motion, may be encoded and recorded in video storage device 22. The pre-trigger contents of the buffer may be encoded and prepended to the post-trigger video captured and encoded after the trigger. Audio also may be encoded with the video.

In one example, to detect motion or scene change, fast frame rate control unit 18 may analyze motion vector data. In particular, fast frame rate control unit 18 may detect motion of a scene change in buffered digital video data by generating a motion vector data indicating motion between at least a portion of one frame of the buffered digital video data and at least a portion of another frame of the buffered digital video data, and detecting motion or a scene change based on the motion vector data. For example, fast frame rate control unit 18 may analyze motion vectors between two consecutive frames of video data received from video processor 16. The motion vector data may be used to detect an object entering a scene or moving within a scene, thereby triggering the start of fast frame rate recording. Fast frame rate control unit 18 may determine that motion has occurred, triggering recording, when the motion vector data exceeds a predetermined threshold value. The threshold value may include a threshold motion value and a threshold object size. As one example, the threshold object size may be a macroblock or smaller or larger block within the video frame.

For example, if a motion vector for a macroblock exceeds a predetermined threshold magnitude, then fast frame rate control unit 18 may trigger recording. As another alternative, fast frame rate control unit 18 may trigger recording if at least a predetermined number of macroblocks have motion vectors that exceed a predetermined threshold magnitude. Alternatively, fast frame rate control unit 18 may consider an average motion vector value or a cumulative motion vector value of blocks across the entire frame or a portion of the frame. When an average or cumulative motion vector value exceeds an applicable, predetermined threshold magnitude, fast frame rate control unit 18 may trigger recording. Again, the threshold magnitude may be selected as a function of a degree of motion of a moving object selected as sufficient to trigger a fast motion event.

In other examples, fast frame rate control unit 18 may determine that motion or scene change has occurred using other methods. In some implementations, fast frame rate control unit 18 may detect motion or scene change without the use of motion vectors. For example, fast frame rate control unit 18 may detect motion or a scene change in the buffered digital video data by generating pixel difference data indicating pixel difference between at least a portion of one frame of the buffered digital video data and at least a portion of another frame of the buffered digital video data, and detecting motion or a scene change based on the pixel difference data. Fast frame rate control unit 18 may calculate a difference, such as a pixel luma and/or chroma difference, between two consecutive frames (or sub-frame video units such as slices, macroblocks, blocks, or pixels) of video data.

Fast frame rate control unit 18 may calculate any of a variety of difference metrics such as, for example, a sum of absolute difference (SAD), a sum of squared difference (SSD), a mean of absolute difference (MAD), a mean of squared difference (MSD), or other difference calculations between frames or sub-frame units of video data. The difference metrics may indicate differences between luma and/or chroma pixel values in successive frames, such as brightness, color, texture or other differences. If the difference metric indicates an overall pixel value difference that exceeds a predetermined threshold magnitude, indicating a fast motion or scene change event, fast frame rate control unit 18 may trigger fast frame rate recording.

As described above, fast frame rate control unit 18 may perform motion estimation, pixel difference calculations and/or other motion detection techniques in the pixel domain to detect motion or scene change, and thereby automatically trigger fast frame rate recording. In some cases, fast frame rate control unit 18 may analyze both motion vectors and difference metrics to determine whether to automatically trigger fast frame rate recording. For example, fast frame rate control unit 18 may trigger fast frame recording if both motion vector data or difference metric data exceed applicable thresholds, or if either motion vector data or difference metric data exceeds an applicable threshold.

In one example, fast frame rate control unit 18 may send video data to video encoder 20 before the trigger to begin recording. Video encoder 20 may generate motion vectors, as would be done for standard video encoding, and send the motion vectors to fast frame rate control unit 18. In some cases, fast frame rate control unit 18 may analyze difference data, e.g., SAD, SSD, MAD, MSD, or the like, provided by video encoder 20. In each case, fast frame control unit 18 may take advantage of motion estimation functionality already provided in video encoder 20 to detect motion or scene change for purposes of triggering fast frame rate recording.

Until fast frame rate recording is triggered, video encoder 20 may discard encoded frames or only complete a portion of the video coding, such as motion estimation, to support frame analysis for automated triggering of fast frame rate recording. Fast frame rate control unit 18 may determine whether to trigger the start of recording based on the motion vectors, difference data, and/or other data calculated by video encoder 20. Fast frame rate control unit 20 may also send a signal to video encoder 20 as to whether or not to store video data in video storage device 22. For example, fast frame rate control unit 20 may signal video encoder 20 not to store data in video storage 22 before the trigger and to begin storing encoded video data in video storage 22 after the trigger.

Figure 2:
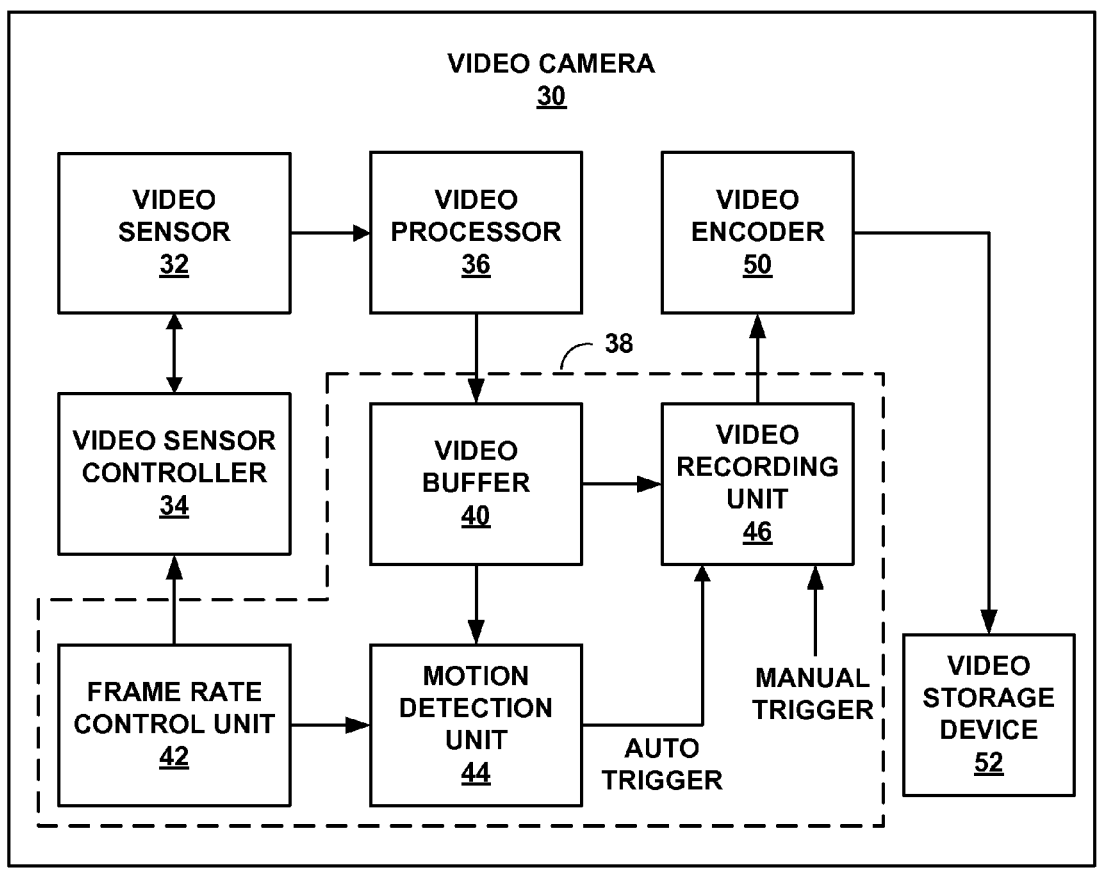
FIG. 2 is a block diagram illustrating an example video camera that combines pre-trigger buffered video data with post-trigger, newly captured video data to record motion or a scene change at a fast frame rate.

FIG. 2 is a block diagram illustrating an example video camera 30 that buffers data before automatic generation of a trigger to begin fast frame rate recording, automatically triggers fast frame rate video recording, and stores video data content of the buffer after the trigger. Video camera 30 may correspond substantially or identically to camera 12 of FIG. 1, but illustrates additional details of an example fast frame rate control unit 38, which may be used to form fast frame rate control unit 18 of FIG. 1. In the example of FIG. 2, video camera 30 includes video sensor 32, video processor 36, video sensor controller 34, fast frame rate control unit 38, video encoder 50, and video storage device 52.

Video camera 30 may comprise a stand-alone video recording device or may be incorporated into another device, such as a wireless communication device or a personal digital assistant (PDA). In general, video sensor 32, video processor 36, video sensor controller 34, video encoder 50, and video storage device 52 may operate similarly to their counterparts (i.e., video sensor 12, video processor 16, video sensor controller 14, video encoder 20 and video storage device 22) as described with respect to FIG. 1. In one example, fast frame rate control unit 38 may correspond to fast frame rate control unit 18 (FIG. 1).

In the example of FIG. 2, fast frame rate control unit 38 includes video buffer 40, frame rate control unit 42, motion detection unit 44, and video recording unit 46. Frame rate control unit 42 generally causes video sensor controller 34 to control video sensor 32 at various frame rates. In one example, video sensor controller 34 causes video sensor 32 to capture video only at a fast frame rate, under the direction of frame rate control unit 42. In another example, frame rate control unit 42 may include two modes: a normal frame rate mode and a fast frame rate mode, where the normal mode comprises a normal frame rate, for example, 15 fps or 30 fps, and the fast frame rate mode comprises a fast frame rate, for example, 60 fps or 120 fps.

In another example, frame rate control unit 42 may support a plurality of frame rate modes ranging anywhere from 1 fps to 120 fps. Frame rate control unit 42 may comprise a user interface input by which a user may select one of a plurality of different frame rate modes. For example, the user interface may comprise a switch external to video camera 30 that can be adjusted between frame rates. As another example, the user interface may comprise a menu of a graphical user interface (GUI) that permits selection of different frame rates via hard keys, soft keys, scroll wheels, or other input media.

When in a normal frame rate mode, frame rate control unit 42 sends a signal to video sensor controller 34 to capture video at the normal frame rate. In turn, video sensor controller 34 causes video sensor 32 to capture video at the normal frame rate. Video sensor 32 sends captured video to video processor 36 for processing, such as filtering, cropping, demosaicing, image enhancement, or other processing of the video frame captured by video sensor 12. Like video processor 16 of FIG. 1, video processor 36 may be realized by a microprocessor, digital signal processor (DSP), application specification integrated circuit (ASIC), field programmable gate array (FPGA), or any other equivalent discrete or integrated logic circuitry.

In one example, video processor 36 may forward frames of the video captured by video sensor 32 to a graphical display (not shown) that functions as a so-called viewfinder so that a user of the camera may observe the captured video and determine when to begin recording. The user may manually activate a "record" button of a user interface (not shown) to begin recording. When video processor 36 receives a manual signal to begin recording, video processor 36 may forward video frames to fast frame rate control unit 38. Until the manual recording signal is received, video camera 30 may reside in an "armed" state in which it may capture, but not record, video at a normal frame rate. In the normal frame rate mode, fast frame rate control unit 38 may forward video data directly to video encoder 50 for encoding and storage. Like video encoder 20, video encoder 50 may form part of an encoder-decoder (CODEC) that encodes the video frame according to a particular encoding technique or format, such as MPEG-2, MPEG-4, ITU H.263, ITU H.264, JPEG, or the like. The video data is stored in video storage device 52 until video processor 36 receives a signal to end recording, e.g., a second press of a record button.

When in a fast frame rate mode, frame rate control unit 42 sends a signal to video sensor controller 34 to capture video at the fast frame rate. In turn, video sensor controller 34 causes video sensor 32 to capture video at the fast frame rate. In one example, video processor 36 forwards video data captured by video sensor 32 to a graphical display (not shown). In accordance with the techniques of this disclosure, video processor 36 may also forward the video data to fast frame rate control unit 38, so that fast frame rate control unit 38 may begin recording automatically upon detecting motion or scene change in the video data, i.e., in response to an automatic trigger. In one example, fast frame rate control unit 38 begins attempting to detect motion only after receiving a signal from a user, e.g., a press of the "record" button. In other examples, fast frame rate control unit 38 begins attempting to detect motion immediately upon entering the fast frame rate mode. Hence, prior to manual or automated triggering of fast frame rate recording, video camera 30 may reside in an "armed" state in which it awaits either a manual trigger from the user or an automatic trigger from fast frame rate controller 38 to begin recording fast frame rate video, e.g., based on motion detection by motion detection unit 44. Notably, although motion detection unit 44 is labeled motion detection unit, it may be configured to detect motion, scene change or both in some examples.

When fast frame rate control unit 38 receives video data during the fast frame rate mode, fast frame rate control unit 38 stores the video data in video buffer 40. As described with reference to FIG. 1, video buffer 40 may comprise, for example, a random access memory (RAM). Video buffer 40 may be arranged according to an array, a linked list, a queue, a ping-pong buffer (e.g., as described with respect to FIG. 4), or other data structure. In general, video buffer 40 stores video data according to a first-in-first-out (FIFO) storage scheme. That is, video buffer 40 stores new video data until video buffer 40 until a certain amount of video data has been received, e.g., until a fixed amount of data has been received or until video buffer 40 is full. Upon receiving video data in excess of the fixed amount of video data, video buffer 40 discards the oldest video data to make room for the newest video data obtained by video sensor 32. For fast frame rate video, video buffer 40 may be sized to store up to 120 frames, e.g., to support recording at 120 fps, 60 fps, 30 fps, or 15 fps.

Motion detection unit 44 compares consecutive frames of video data in video buffer 40 to detect motion between the two frames. As described above with reference to FIG. 1, motion detection unit 44 may detect motion based on motion vectors between consecutive frames. For example, motion detection unit 44 may calculate motion vectors for units of data between the two consecutive frames, such as slices, macroblocks, smaller blocks, pixels, or other units of data. Motion detection unit 44 may determine that motion has occurred upon detecting fast motion. In one example, motion detection unit 44 determines that fast motion has occurred between two consecutive frames when a single motion vector of block or macroblock exceeds a threshold magnitude.

In another example, motion detection unit 44 determines that fast motion has occurred when a certain number of motion vectors of multiple blocks or macroblocks each exceed a threshold magnitude. In another example, motion detection unit 44 determines that fast motion has occurred when an average or aggregation of magnitudes of a plurality of motion vectors exceeds a threshold magnitude. Motion detection unit 44 may detect motion based only on luminance values of a frame, only on chrominance values of a frame, or a combination of luminance and chrominance. As one example, motion detection unit 44 may calculate motion vectors only for luma blocks of a current frame based on luma blocks of a reference frame, without calculating motion based on chroma blocks of the current frame.

In another example, as discussed with reference to FIG. 1, motion detection unit 44 may calculate a difference metric indicating a difference between two consecutive frames or two co-located sub-frame portions (such as slices, macroblocks, or blocks) of two consecutive frames to detect fast motion. For example, as described above with reference to FIG. 1, motion detection unit 44 may calculate SAD, SSD, MAD, MSD, or other difference metric calculations to detect motion or scene change between two consecutive frames. Motion detection unit 44 may also compare horizontal or vertical projections of two consecutive frames to detect motion between the two consecutive frames. In general, a projection comprises an aggregation of pixels, e.g., a vertical projection may comprise an aggregation of a column of pixels and a horizontal projection may comprise an aggregation of a row of pixels. Motion detection unit 44 may therefore calculate horizontal and/or vertical projections for the two consecutive frames and determine that motion has occurred when one or more of the projections differs by a threshold amount.

After motion detection unit 44 determines that motion or a scene change has occurred between two consecutive frames of video data from video buffer 40, fast frame rate control unit 38 may begin transferring video data to video encoder 50 for encoding and storage in video storage 52. As mentioned previously, in some implementations, fast frame rate control unit 38 may use motion estimation and/or difference metric functionality provided within video encoder 50 to detect motion or scene change between successive frames. Alternatively, fast frame rate control unit 38 may include its own motion estimation and/or difference metric functionality. In either case, once motion is detected, fast frame rate control unit 38 may direct video encoder 50 to encode the capture video data and store it in video storage device 52.

In response to an automatic trigger ("AUTO TRIGGER") from motion detection unit 44 or manual trigger ("MANUAL TRIGGER") from the user in the fast frame rate mode, or in response to a manual trigger from the user in the normal frame rate mode, video recording unit 46 retrieves the contents of video buffer 40 and provides it to video encoder 50 to be encoded and stored in video storage device 52. In this manner, video recording unit 46 causes video data from video buffer 40 to be encoded and stored after receiving a signal to begin recording. The video data in video buffer 40 may be raw pixel data. The encoded video data produced by video encoder 50 and stored in video storage device 52 may be encoded according to any of a variety of techniques, as mentioned above. In general, such encoding techniques may perform inter- and intra-coding, transform coding (e.g., discrete cosine transform or integer transform), quantization and entropy coding. In a normal frame rate mode, e.g., 15 fps or 30 fps, video recording unit 46 receives a manual trigger signal from a user, e.g., via a user interface (not shown) such as a "record" button. In a fast frame rate mode, such as greater than 30 fps (e.g., 60 fps or 120 fps), video recording unit 146 receives an automatic trigger signal from motion detection unit 144 or a manual trigger signal from a user to begin recording. In the fast frame rate mode, video recording unit 46 may copy at least some of the pre-trigger contents of video buffer 40 for encoding by video encoder 50 upon receiving the automatic or manual trigger signal, and send post-trigger contents of video buffer 40 to video encoder 50 for encoding until a signal to stop recording is received, or until a maximum recording time interval expires.

In one example, video buffer 40 may comprise a high-speed memory device, such as a high-speed random access memory (RAM), to quickly store video data recorded at the fast frame rate. In other examples, video buffer 40 may comprise a first portion to buffer video data recorded at the fast frame rate before the detection of motion and a second portion to store video data recorded at the fast frame rate after the detection of motion. In some examples, fast frame rate control unit 38 may store raw video data directly to video storage device 52, without first sending the video data to video encoder 50 for digital encoding. Video storage device 52 may comprise any volatile or non-volatile memory or storage device, such as electrically erasable programmable read-only memory (EEPROM), or FLASH memory, or such as a magnetic data storage device or optical data storage device. In some aspects, video storage device 152, in general, may provide longer term, higher capacity storage than video buffer 40.

Motion detection unit 44 may detect fast motion of an object already in the scene, or entrance of an object into the scene at a fast rate. Motion detection unit 44 may also detect a scene change, a dramatic lighting change (such as a lightning flash), or other large change between two frames. In response to detecting fast motion or other large difference between two frames, motion detection unit 44 may automatically trigger recording including recording of video data that was buffered in video buffer 40 before the automated trigger signal was received and video data that is added to video buffer 40 by video sensor 32 and video processor 36 after the automated trigger signal.

FIGS. 3A-3C are conceptual diagrams illustrating example consecutive video data units for which motion detection unit 44 (FIG. 2) may attempt to detect motion. FIG. 3A illustrates an example of two consecutive video frames 60, 62 that may be obtained at a fast frame rate by video sensor 32 and stored in video buffer 40. In the example of FIG. 3A, motion detection unit 44 determines that data of block 64 of frame 60 has substantially moved, as indicated by the position of a closely matching block 70 in frame 62. That is, motion detection unit 44 determines that the data of block 70 is similar to data of block 64. Block 66 represents the block of frame 62 that is co-located with block 64 of frame 60. Motion vector 68 generally describes the motion from the position of block 64, corresponding to the position of block 66, to block 70. Motion detection unit 44 may execute a motion search algorithm to identify block 70 of frame 62 as a closest match for block 64 of frame 60 and to calculate motion vector 68.

Motion detection unit 44 may also calculate a magnitude for motion vector 68. Motion detection unit 44 may calculate the magnitude as:

$$\mathrm{mag}(MV) = \sqrt{(x_2 - x_1)^2 + (y_2 - y_1)^2}$$

where $(x_2, y_2)$ represents the coordinates of the end of motion vector 68, i.e., the top left corner of block 70, where $(x_1, y_1)$ represents the coordinates of the beginning of motion vector 68, i.e., the top left corner of block 66, and where MV represents the vector $(x_1, y_1) \rightarrow (x_2, y_2)$. Motion detection unit 44 may compare the magnitude of motion vector 68 to a threshold magnitude. In one example, when the calculated magnitude of a motion vector 68 for any block in frame 60 is equal to or exceeds the threshold, motion detection unit 44 may determine that motion has occurred between frames 60 and 62. The block may be a macroblock, or a smaller or larger block, within the frame. Motion detection unit 44 may signal fast frame rate control unit 38 to begin recording, i.e., storing, video data, including buffered frames 60, 62 and later frames in video storage device 52. In particular, fast frame rate control unit 38 may store the pre-trigger contents of video buffer 40, up to frame 62, in video storage 52, and prepend the pre-trigger contents of video buffer 40 to post-trigger video data added to video buffer 40 after frame 62.

FIG. 3B illustrates another example of two consecutive video frames 80, 82 that may be present in video buffer 40. Motion detection unit 44 may determine that motion has occurred from a plurality of motion vectors, e.g., by calculating an aggregate magnitude of the motion vectors or by determining that the magnitudes of each of a plurality of motion vectors exceed a threshold. In the example of FIG. 3B, motion detection unit 44 calculates three motion vectors 88, 96, 104. Motion detection unit 44 calculates motion vector 88 as the motion from block 84 in frame 80 to block 90 in frame 82, motion vector 96 as the motion from block 92 in frame 80 to block 98 in frame 82, and motion vector 104 as the motion from block 100 in frame 80 to block 106 in frame 82. Blocks 86, 94, 102 represent the co-located blocks in frame 82 of blocks 84, 92, 100 in frame 80.

In one example, motion detection unit 44 calculates an aggregated, e.g., average, magnitude of a plurality of motion vectors and determines that motion has occurred when the aggregate magnitude exceeds a threshold. In one example, motion detection unit 44 calculates, for N motion vectors MV:

$$\text{aggregate} = \frac{1}{N} \sum_{i=1}^{N} mag\,(MV_i),$$

$$\text{where } mag\,(MV_i) = \sqrt{(x_{i_2} - x_{i_1})^2 + (y_{i_2} - y_{i_1})^2}$$

where $(x_{i2}, y_{i2})$ represents the coordinates of the end of motion vector i, where $(x_{i1}, y_{i1})$ represents the coordinates of the beginning of motion vector i, and where $MV_i$ represents the vector $(x_{i1}, y_{i1}) \rightarrow (x_{i2}, y_{i2})$. In this manner, motion detection unit 44 may calculate the aggregate magnitude of the motion vectors as the average of the magnitudes of each of motion vectors 88, 96, 104 and determine whether the aggregate magnitude exceeds a threshold magnitude to determine whether fast motion has occurred. In another example, motion detection unit 44 calculates mag(MV$_i$) for each of N motion vectors and determines that motion has occurred when the magnitude of each of, or at least a subset of, the N motion vectors exceeds a threshold magnitude. Hence, motion vectors for a subset of blocks at selected positions in a frame may be considered for motion detection. Although three blocks 84, 92, 100 are shown in FIG. 3B for purposes of illustration, motion detection unit 44 may analyze motion vectors fro a greater or lesser number of blocks in the frame.

FIG. 3C illustrates two frames 110, 112, each comprising a plurality of bocks of video data. Frame 110 comprises blocks 114A-114R (blocks 114) and frame 112 comprises blocks 116A-116R (blocks 116). Although frames 110, 112 each comprise sixteen blocks in the example of FIG. 3C, the number of blocks illustrated is merely presented for ease of illustration and discussion. In other examples, blocks 114, 116 may represent slices, macroblocks, blocks, pixels, or other sub-frame units of data.

Each of blocks 116 of frame 112 are co-located with a corresponding one of blocks 114 of frame 110. For example, block 116A represents a block of frame 112 that is co-located with block 114A of frame 110. In one example, motion detection unit 44 determines that motion has occurred between frame 110 and frame 112 by calculating differences between each of blocks 116 and the corresponding one of blocks 114. Motion detection unit 44 may calculate, for example, SAD, SSD, MAD, MSD, or other representations of differences between frames 110 and 112. In one example, motion detection unit 44 determines that motion or scene change has occurred when a difference between one of blocks 116 and a corresponding one of blocks 114 exceeds a threshold. For example, motion detection unit 44 may determine that motion or scene change has occurred when the value SSD (114G, 116G), i.e., the sum of squared difference between block 114G and block 116G, exceeds a threshold. In another example, motion detection unit 44 determines that motion has occurred when the overall difference between frames 110 and 112 exceeds a threshold. In another example, motion detection unit 44 determines that motion or scene change has occurred when the differences between a subset of blocks 116 and corresponding subsets of blocks 114 each exceed a threshold.

The techniques described with reference to FIGS. 3A-3C represent any of a wide variety of motion vector-based or difference-based techniques that could be used, e.g., by video camera 12 of FIG. 1 or video camera 30 of FIG. 2, as an indication of motion or scene change between successive frames, and should not be considered limiting of motion detection techniques more generally. Also, although motion between two successive frames is described, in some cases it may be desirable to analyze motion over two or more frames, including two or more successive frames, or two or more non-successive frames.

FIGS. 4A and 4B are conceptual diagrams illustrating an example ping-pong buffer 120. Ping-pong buffer 120 may be used to implement a video buffer within fast frame rate control unit 18 of FIG. 1 or to implement video buffer 40 of fast frame rate control unit 38 of FIG. 2. Ping-pong buffer 120 comprises two internal buffers 122A, 122B (buffers 122). Each of buffers 122 may store data according to a FIFO storage scheme. That is, when data is read from one of buffers 122, the data is the oldest data written to the one of buffers 122. Moreover, when one of buffers 122 becomes full, the newest data overwrites the oldest data of the one of buffers 122. For example, when buffer 122A becomes full, and when new data is added to buffer 122A, the new data will overwrite the oldest data of buffer 122A. Buffers 122 may comprise, for example, arrays, queues, linked lists, or other data structures.

In general, data can be written to one buffer while the other buffer is being read. In particular, data can be written to one of buffers 122 while the other of buffers 122 processes, clears, and/or outputs data. For example, as shown in FIG. 4A, when data is written to buffer 122B, buffer 122A may output data to be read. Similarly, as shown in FIG. 4B, when data is written to buffer 122A, buffer 122B may output data to be read. When ping-pong buffer 120 is full, i.e., when both buffer 122A and buffer 122B are full, and when data is written to ping-pong buffer 120, the data is written to one of buffers 122 while the oldest data of the other of buffers 122 is cleared. For example, when data is written to buffer 122A when ping-pong buffer 120 is full, the oldest data of buffer 122B is cleared. Likewise, when data is written to buffer 122B when ping-pong buffer 120 is full, the oldest data of buffer 122A is cleared. In this manner, ping-pong buffer 120 may effectively double the available bandwidth and processing speed of a standard data buffer.

In the context of the techniques of this disclosure, ping-pong buffer 120 may enable live encoding, e.g., by video encoder 50 (FIG. 2). For example, video encoder 50 may read a frame from ping-pong buffer 120 while fast frame rate control unit 38 is storing a frame to ping pong buffer 120. Ping-pong buffer 120 may also clear the cell in which the most recently read video frame was stored. Therefore, fast frame rate control unit 38 may store the next captured frame in the most recently cleared cell while video encoder 50 may retrieve the next frame to be encoded from ping-pong buffer 120.

Figure 5:
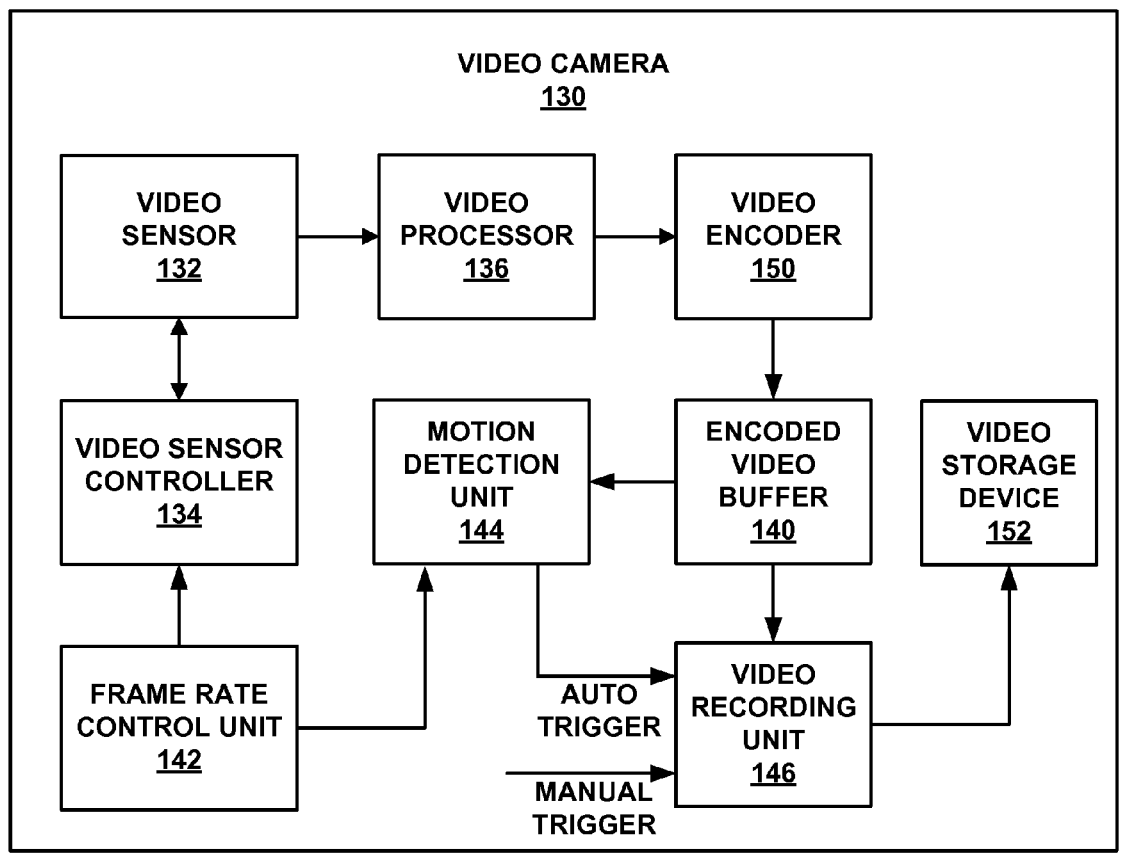
FIG. 5 is a block diagram illustrating an alternative example of a video camera that combines pre-trigger buffered video data with post-trigger video data to record motion or a scene change at a fast frame rate.

FIG. 5 is a block diagram illustrating an alternative example of a video camera 130 that automatically begins recording upon detection of fast motion in a fast frame rate mode. Video camera 130 of FIG. 5 may be similar to video camera 10 of FIG. 1 or video camera 30 of FIG. 3, but illustrates an alternative implementation in which video obtained by the camera is at least partially encoded and motion detection is performed using encoded video to determine whether to record the encoded video. In the example of FIG. 5, video camera 130 includes video sensor 132, video sensor controller 134, video processor 136, encoded video buffer 140, frame rate control unit 142, motion detection unit 144, video recording unit 146, video encoder 150, and video storage device 152. The components included in video camera 130 and illustrated in FIG. 5 may be realized by any suitable combination of hardware and/or software. In the illustrated example, the components are depicted as separate units. However, in other examples, any of the components may be integrated into combined units within common hardware, firmware and/or software. Video camera 130 may comprise a stand-alone video recording device or may be incorporated into another device, such as a wireless communication device or a personal digital assistant (PDA).

Like video sensor 12 or video sensor 32, video sensor 132 obtains light information from a scene prior to capturing a video frame of the scene. Like video sensor controller 14 or video sensor controller 34, video sensor controller 134 may utilize the light information for preliminary visual front end (VFE) processing, such as automatic focus and automatic exposure. Video sensor controller 134 also may cause video sensor 132 to capture video frames at one or more various frame rates, e.g., at a normal frame rate and at a high frame rate. Examples of normal and high frame rates are 15 or 30 fps, or 60 or 120 fps, respectively.

Frame rate control unit 142 sends a signal to video sensor controller 134 indicating which frame rate to use, normal or fast. Frame rate control unit 142, like frame rate control unit 42, may comprise a user interface, e.g., a button, a switch, a menu option of a graphical user interface presented by a viewfinder (not shown), or other interface, that allows a user to select between frame rates, e.g., a normal frame rate and a fast frame rate. In one example, video camera 130 may comprise only a fast frame rate mode. The fast frame rate mode may be greater than 30 fps, e.g., 60 fps or 120 fps.

In a normal mode, e.g., 15 fps or 30 fps, video sensor controller 134 causes video sensor 132 to capture video at the normal frame rate after receiving a signal to begin recording, e.g., a user manually pressing a "record" button. Video sensor 132 sends captured video to video processor 136 for processing, such as filtering, cropping, demosaicing, image enhancement, or other processing of the video frame captured by video sensor 132. Video processor 136 may be realized by a microprocessor, digital signal processor (DSP), application specification integrated circuit (ASIC), field programmable gate array (FPGA), or any other equivalent discrete or integrated logic circuitry. Video processor 136 sends processed frames to video encoder 150 for video compression. Video encoder 150 may form part of an encoder-decoder (CODEC) that encodes the video frame according to a particular encoding technique or format, such as MPEG-2, MPEG-4, ITU H.263, ITU H.264, JPEG, or the like.

Figure 6:
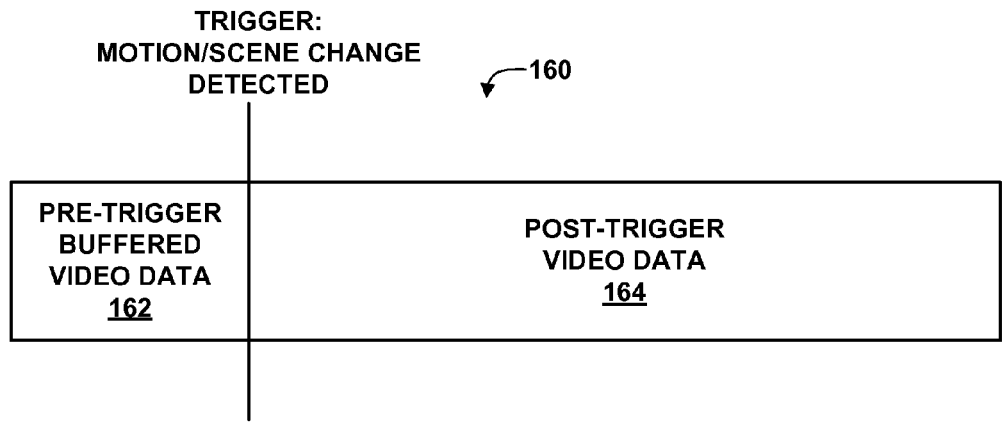
FIG. 6 is a conceptual diagram illustrating an example recorded video segment recorded at a fast frame rate using pre-trigger buffered video data and post-trigger video data.

In the example of FIG. 6, video encoder 150 encodes video frames obtained from video processor 136. In particular, video encoder 150 may encode all video frames obtained from video processor 136 without the need to wait for a recording signal to trigger encoding. Rather, in the ordinary course, video encoder 150 of FIG. 5 encodes video obtained from video sensor 132 and video processor 136. Video encoder 150 sends the encoded video frames to encoded video buffer 140. In this case, motion detection unit 144 may use the encoded video in encoded video buffer 140 to detect motion or scene change. If the video is accompanied by audio information, the audio may also be sent to encoded video buffer 140, either independently or in conjunction with the video frames. Encoded video buffer 140 may comprise a volatile or non-volatile memory or storage device, such as random access memory (RAM), FLASH memory, or a magnetic data storage device or optical data storage device. Encoded video buffer 140 may be implemented as an array, a queue, a ping-pong buffer (e.g., as described with respect to FIG. 4), a linked list, or other data structure. In general, encoded video buffer 140 stores the video frames according to a FIFO storage scheme.

In one example, as mentioned above, the size of encoded video buffer 140 is determined by the time of the playback speed of the video. For example, the size of encoded video buffer 140 may be of a size capable of storing 30 frames of video data, such that when the video data is played back at 30 fps, one second of data is available. That is, encoded video buffer 140 may store 30 frames of encoded video data. In another example, the buffer size is determined according to the recording time of the video. For example, the buffer may be of a size capable of storing one second of video data at the fast frame rate, e.g., 60 frames for a 60 fps mode or 120 frames for a 120 fps mode. The buffer size may also be customized to accommodate other recording lengths, e.g., one-half second, two seconds, five seconds, and so forth.

Video recording unit 146 stores data from encoded video buffer 140 in video storage device 152 after receiving a trigger signal to begin recording. Until the trigger signal is received, encoded data from encoded video buffer 140 may be written to video storage device 152, but overwritten periodically, or discarded without being written to video storage device. After the trigger signal is received, pre-trigger and post-trigger video data from encoded video buffer 140 may be stored in video storage device 152. In a normal frame rate mode, e.g., 15 fps or 30 fps, video recording unit 146 receives a manual trigger signal from a user, e.g., via a user interface (not shown) such as a "record" button. In a fast frame rate mode, such as greater than 30 fps, e.g., 60 fps or 120 fps, video recording unit 146 receives an automatic trigger signal from motion detection unit 144 or a manual trigger signal from a user to begin recording. In the fast frame rate mode, video recording unit 146 copies pre-trigger and post-trigger contents of encoded video buffer 144 to video storage device 152 upon receiving the trigger to begin recording from motion detection unit 144.

Motion detection unit 144 sends the automatic trigger signal to video recording unit 146 in the fast frame rate mode upon detecting motion or scene change between two frames of encoded video data in encoded video buffer 140. In particular, in the example of FIG. 5, and as described above, motion detection unit 144 may inspect motion vector data generated in encoded video produced by video encoder 150 to determine whether one or more of the motion vectors represents fast motion. In one example, motion detection unit 144 calculates magnitudes of all or some of the motion vectors of a particular frame and determines that fast motion has occurred when at least one of the magnitudes exceeds a magnitude threshold, when an average magnitude or aggregate magnitude of multiple motion vectors exceeds the threshold, or when each of a subset of the motion vectors of a particular frame exceeds the threshold. Additionally, or alternatively, motion detection unit 144 may determine that fast motion or scene change has occurred when, for an inter-coded frame (such as a P-frame or a B-frame), one or more blocks or macroblocks of the inter-coded frame are intra-coded. In general, blocks of a P-frame or a B-frame are intra-coded when no sufficiently matching macroblock of the previous frame can be identified. Therefore, one or more macroblocks of an inter-coded frame that are intra-coded may indicate that a fast motion event has occurred. In response to detecting fast motion, motion detection unit 144 triggers video recording unit 146 to begin recording the encoded video in video storage device 152.

In another example, rather than examining motion vectors, motion detection unit 144 may compare DC values of encoded data that has undergone a discrete cosine transform (DCT). Video encoder 150 may comprise a transform unit that executes a DCT function on residual video data. Motion detection unit 144 may determine, for two co-located blocks, whether the DC values of the DCT-coded blocks differ by a threshold amount. When motion detection unit 144 determines that the DC values differ by more than the threshold amount, motion detection unit 144 may determine that a fast motion or scene change event has occurred. In other examples, motion detection unit 144 may compare other values related to the DCT-coded blocks, such as differences between co-located AC values of the DCT-coded blocks. Hence, in the example of FIG. 5, motion detection unit 144 may rely on transform domain data or motion vector data produced by video encoder 150 to detect fast motion events, and automatically trigger video recording in video storage device 152 at a fast frame rate by video recording unit 146. Motion detection unit 144 also may detect motion of scene change, as described above, based on difference data such as SAD, SSD, MAD, MSD, or other difference calculations between frames or sub-frame units of video data.

FIG. 6 is a conceptual diagram illustrating an example recorded video segment 160 that was recorded at a fast frame rate in accordance with the techniques of this disclosure. As described with respect to FIG. 2, for example, video data is initially sent to video buffer 40 in the fast frame rate mode. Motion detection unit 44 determines whether motion or scene change has occurred between two frames of data in video buffer 40 and triggers recording upon detecting motion. After the trigger, video data is stored in video storage device 52. As discussed with respect to FIG. 2, the contents of video buffer 40 for a period of time prior to the automatic trigger to begin recording are prepended to the recorded video data in video storage 52. Therefore, as illustrated in FIG. 6, recorded video segment 160 comprises post-trigger video data 164 and pre-trigger, buffered video data 162. After the automatic trigger signal indicating detection of fast motion, newly obtained video data is written to buffer 40, retrieved from buffer 40 by video recording unit 46, encoded by video encoder 50, and stored as encoded video data in video storage device 52. Also, at least some of the contents of video buffer 44 obtained prior to the automatic trigger signal (i.e., pre-trigger buffered video data 162 in FIG. 6) are encoded and prepended to post-trigger video data 164, thus forming recorded video segment 160 as ultimately stored in video storage 52. Recorded video segment 160 may also represent video segments stored in video storage device 22 (FIG. 1) and video storage device 152 (FIG. 5), in other examples.

In summary, upon receipt of an automatic motion detection trigger signal, video recording unit 46 retrieves at least a portion of the pre-trigger contents previously written to video buffer 40 by video processor 36 for encoding by video encoder 50 and storage in video storage device 52. In some examples, for N fps video, the pre-trigger video from video buffer 40 may include N video frames, e.g., 60 or 120 frames. Video recording unit 46 then continues to retrieve newly added, post-trigger video data from video buffer 40, as it is written to the video buffer by video processor 36, for encoding by video encoder 50 and recording by video storage device 52. Recording may continue while the fast frame rate video recording mode is active. In some cases, recording may be terminated by a manual stop recording signal entered by a user, or upon expiration of a maximum fast frame rate recording interval, which could be on the order of a few seconds, several seconds, a few minutes or several minutes, depending on implementation and design considerations.

For the example of FIG. 5, video recording unit 146 may respond to an automatic trigger signal or manual trigger signal, and retrieve both pre-trigger, previously encoded data from encoded video buffer 140 and post-trigger, newly encoded data from encoded video buffer 140. Hence, the previously encoded video data may be prepended to the encoded video data that is obtained after the automatic trigger signal. In this manner, in each of the examples of FIGS. 1, 2 and 5, video obtained just before the motion detection may be viewed along with video obtained after the motion detection so that a viewer can observe a video sequence without missing the motion or scene change event, e.g., bird flying, ball being kicked, or the like.

FIG. 7 is a block diagram illustrating an example wireless communication device 170 including a video camera 172 that records video at a fast frame rate according to the techniques of this disclosure. In the example of FIG. 7, wireless communication device 170 includes video camera 172, video encoder-decoder (CODEC) 174, modulator/demodulator (modem) 176, transceiver 178, processor 180, user interface 182, memory 184, data storage device 185, antenna 186, and bus 188. The components included in wireless communication device 170 illustrated in FIG. 7 may be realized by any suitable combination of hardware and/or software. In the illustrated example, the components are depicted as separate units. However, in other examples, the various components may be integrated into combined units within common hardware and/or software. As one example, memory 184 may store instructions executable by processor 180 corresponding to various functions of video CODEC 174. As another example, video camera 172 may include a video CODEC that performs the functions of video codec 174, e.g., encoding and/or decoding video data.

Video camera 172 may correspond to video camera 10 (FIG. 1), video camera 30 (FIG. 2), video camera 130 (FIG. 5), or other video cameras implementing techniques for fast frame rate recording in accordance with this disclosure. In general, video camera 172 may record video data at a fast frame rate and begins recording upon detection of motion. Video camera 172 may also buffer a certain amount of video data, e.g., 30 frames worth of video data, in a buffer in memory 184 at the fast frame rate in a FIFO buffering scheme and record the buffered video data along with the video data obtained after the detection of motion in a data storage device 185. Video camera 172 may send raw, recorded video data, including the buffered video data before the detection of motion, to video codec 174 for encoding and then to data storage device 185 via bus 188 for data storage. Processor 180 may send signals to video camera 172 via bus 188 regarding a mode (e.g., a normal frame rate mode or a fast frame rate mode) at which to record video, a frame rate at which to record video, a time at which to end recording or to change frame rate modes, a time at which to send video data to video codec 174, or signals indicating other modes or parameters.

User interface 182 may comprise one or more interfaces, such as input and output interfaces. For example, user interface 182 may include a touch screen, a keypad, buttons, a screen that may act as a viewfinder, a microphone, a speaker, or other interfaces. As video camera 172 receives video data, processor 180 may signal video camera 172 to send the video data to user interface 182 to be displayed on the viewfinder. In some examples, the viewfinder refreshes at a normal frame rate that is less than the fast frame rate of recording, e.g., 30 fps or 15 fps. To accomplish this, as one example, processor 180 may drop every other frame recorded at 60 fps to cause user interface 182 to display video frames at 30 fps, i.e., temporally sub-sample frames, where the dropped frames are dropped for the purpose of display only (i.e., the dropped frames may still be buffered and/or stored, just not displayed). A user may interact with user interface 182 to switch between a normal frame rate mode and a fast frame rate mode.

In the normal frame rate mode, a user may interact manually with user interface 182 to cause video camera 172 to begin recording at the normal frame rate. In the fast frame rate, the user may interact manually with user interface 182 to cause video camera 172 to begin to attempt detecting motion or scene change and/or to begin recording at a fast frame rate. In one example, when in the fast frame rate mode, wireless communication device 170 is armed for fast frame rate recording, but stores only the video data recorded after receiving an automatic trigger based on detection of motion, as well as the pre-trigger, buffered video data (e.g., the 30 frames in the video buffer) that was buffered before the detection of motion. In one example, a user may manually interact with user interface 182 to begin recording at a fast frame rate without requiring detection of motion, i.e., the automated detection of motion or scene change to begin recording may be an optional feature of wireless communication device 170.

Video CODEC 174 may encode video data from video camera 172 and decode video data received via antenna 186, transceiver 178, and modem 176. Video CODEC 174 additionally or alternatively may decode previously encoded data received from data storage device 185 for playback. A user may interact with user interface 182 to transmit a recorded video segment in data storage device 185 to another device, such as another wireless communication device, via modem 176, transceiver 178, and antenna 186. The video segment may be encoded according to an encoding standard, such as MPEG-2, MPEG-3, MPEG-4, H.263, H.264, or other video encoding standards. Wireless communication device 170 may also receive an encoded video segment and store the received video segment in data storage device 185. To display an encoded video segment in data storage device 185, such as a recorded video segment or a received video segment, video CODEC 174 may decode the video segment and send decoded frames of the video segment to user interface 182. When a video segment includes audio data, video CODEC 174 may decode the audio, or wireless communication device 170 may further include an audio codec (not shown) to decode the audio. In this manner, video CODEC 174 may perform both the functions of an encoder and of a decoder.

Memory 184 may be encoded with computer-readable instructions that cause processor 180 to perform various tasks, in addition to storing encoded video data. Such instructions may be loaded into memory 184 from a data storage device such as data storage device 185. For example, the instructions may cause processor 180 to perform the functions of video CODEC 174, the triggering of video recording for video camera 172, such as fast frame rate video recording or normal frame rate recording, or other functions.

Figure 8:
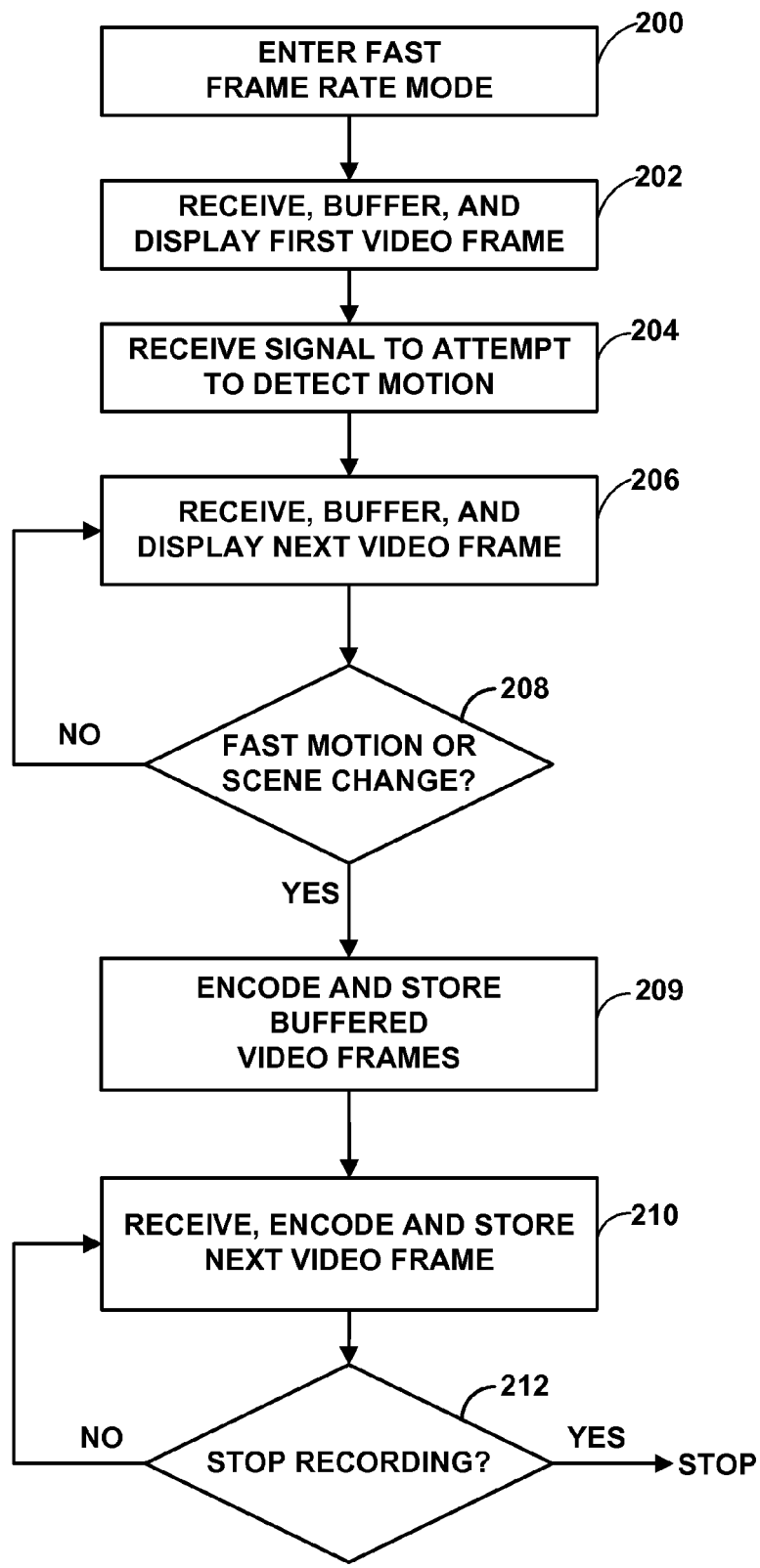
FIG. 8 is a flowchart illustrating an example method for recording video data at a fast frame rate upon detection of motion or a scene change.

FIG. 8 is a flowchart illustrating an example method for recording video data at a fast frame rate upon detection of a motion event. Although described with respect to the example video camera 30 of FIG. 2, it should be understood that other video cameras that are capable of recording video at a fast frame rate may also perform the method described with respect to FIG. 8. For example, video camera 10 of FIG. 1 or video camera 130 of FIG. 5 may perform the method described with respect to FIG. 8.

Initially, video camera 30 receives an indication to enter a fast frame rate mode, e.g., with frame rate control unit 42, and enters the fast frame rate mode (200). For example, frame rate control unit 42 may receive a signal from a user via a user interface to enter the fast frame rate mode. The signal may further specify the frame rate at which to record data, e.g., 60 fps or 120 fps. Video camera 30 then begins to capture digital video data via video sensor 32 at a fast frame rate. In the example of FIG. 8, video camera 30 receives, buffers, and displays a first video frame (202) and then receives a signal to attempt to detect motion (204) to support automatic triggering of fast frame rate recording. In other examples, the signal to enter the fast frame rate mode may comprise the signal to attempt to detect motion. Also, in other examples, video camera 30 may receive a plurality of video frames in a normal frame rate mode, such as 30 fps or less (e.g., 15 fps or 30 fps), before receiving the signal to attempt to detect motion.

Video camera 30 stores video frames received prior to detecting motion in video buffer 40. In order to detect motion, video camera 30 may buffer two or more successive frames in video buffer 40 and compares the frames. In some cases, N frames may be buffered in video buffer 40 at a given time, where the fast frame rate is N fps. Video camera 30 also may display at least some of the received video frame prior to detecting motion, e.g., via a viewfinder, which may assist a user in positioning video camera 30 and adjusting settings of video camera 30 (such as zoom, focus, brightness, contrast, etc.). Thus, video camera 30 may receive, buffers, and displays the next video frame (206). The viewfinder or another display device also may support playback or recorded video. Additionally, or alternatively, recorded video may be transferred to another device such as a computer with display or a dedicated display device for playback.

Video camera 30 continues to receive, buffer, and display a next video frame after receiving the signal to attempt to detect motion until motion detection unit 44 detects a fast motion event or scene change (208). For example, motion detection unit 44 may analyze motion vector data or difference metric data that indicates motion or scene change, as described in this disclosure. The motion vector data or difference metric data may apply to individual blocks, subsets of blocks, or entire slices or frames. Motion detection unit 44 may determine that fast motion or scene change has occurred, for example, when a magnitude of a motion vector exceeds a threshold. Motion detection unit 44 may also determine that motion or scene change has occurred when a difference metric such as an SAD, SSD, MAD, MSD, or other difference calculation between two or more co-located macroblocks or smaller blocks of two sequential frames exceeds a threshold value.

As described in this disclosure, in some examples, to detect motion or scene change, motion detection unit 44 may analyze motion vectors for all of some of the macroblocks or smaller blocks in a frame, and detect motion or scene change if one of the motion vectors exceeds a threshold value, if a predetermined number of motion vectors for blocks or macroblocks exceeds a threshold value, if an average motion vector exceeds a threshold value, if a sum of the motion vectors exceeds a threshold value, or the like. Similarly, to detect motion, in some examples, motion detection unit 44 may analyze difference metrics for all or some of the macroblocks or smaller blocks in a frame, or for the entire frame, and detect motion if the overall difference metric for the frame exceeds a threshold, if an average difference metric exceeds a threshold, if the difference metric for a predetermined number of blocks exceeds a threshold value, or the like. As a further alternative, motion detection unit 44 may compare horizontal or vertical projections of two consecutive frames to detect motion between the two consecutive frames.

In another example, e.g., as described with respect to FIG. 5, motion detection unit 144 (FIG. 5) may receive motion vectors from an encoded video buffer 140 and determine that a motion or scene change event has occurred when a magnitude of one or more of the motion vectors exceeds a minimum threshold. Motion detection unit 144 may also detect motion or scene change when a block or macroblock of an inter-coded frame is intra-encoded, or when a predetermined number of blocks are intra-coded. Motion detection unit 144, alternatively or additionally, may analyze DCT transform coefficients, as described above, and detect motion based on DC values or differences between DC values.

Upon detecting fast motion or scene change ("YES" branch of 208), and receiving an automatic fast frame rate recording trigger, video camera 30 begins recording subsequent frames of video data. Video camera 30 may encode and store one or more pre-trigger, buffered video frames (209) from the temporary buffer, and then receive, encode and store the next, post-trigger video frame (210). In this manner, pre-trigger frames and post-trigger frames can be recorded to ensure that the viewer does not miss the motion event in the recorded video sequence, e.g., as shown in FIG. 6. The next, post-trigger video frame, like the one or more pre-trigger video frames, may be retrieved from the buffer for encoding and storage at the fast frame rate. Each post-trigger frame received after the detection of motion may be displayed via the viewfinder. Recording in video storage device 52 may continue until a user sends a signal to end the recording (212), e.g., by pressing a "record" or "stop" button, or until a maximum recording interval is exceeded.

Figure 9:
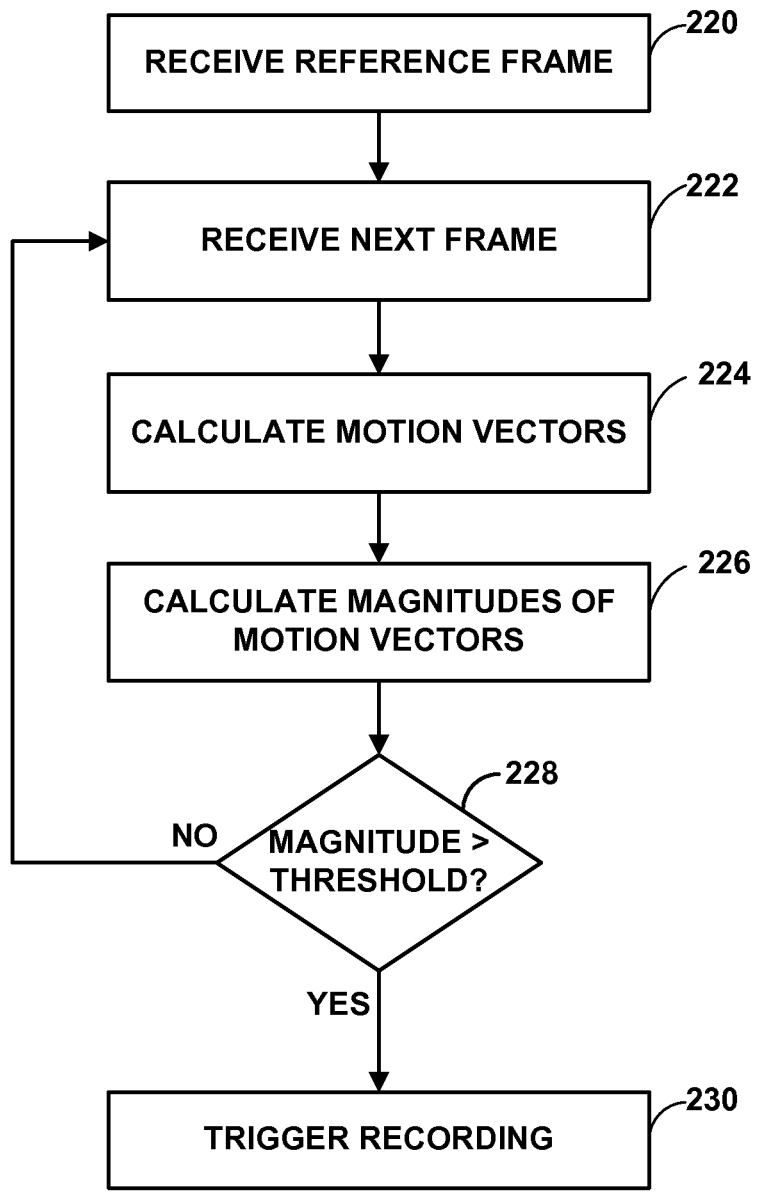
FIG. 9 is a flowchart illustrating an example method for detecting motion or scene change between video frames based on motion vector data.

FIG. 9 is a flowchart illustrating an example method for detecting motion between two video frames in order to trigger recording using motion vectors. The method of FIG. 9 may generally correspond to step 208 of FIG. 8, in one example. Initially, motion detection unit 44 receives a reference frame (220) and a frame following the reference frame (222), the frame following the reference frame being referred to in this disclosure as the "next frame." The reference frame and the next frame may comprise video frames in video buffer 40. Rather than actually receiving the frames, motion detection unit 44 may receive memory locations of the frames in video buffer 40.

Motion detection unit 44 may then calculate one or more motion vectors for blocks, macroblocks, frames, or other video data units of the next frame based on the reference frame (224). For example, for a block of the next frame (i.e., the frame following the reference frame), motion detection unit 44 may perform a motion search of the reference frame to identify a block that most closely matches. Motion detection unit 44 may identify a match by calculating a difference, such as SAD or SSD values, between the two blocks being compared.

Motion detection unit 44 calculates a magnitude for each calculated motion vector (226). In one example, motion detection unit 44 may calculate an average of the magnitudes for a subset of the motion vectors to determine an average magnitude. Motion detection unit 44 then determines whether the magnitude of any single motion vector (or the average magnitude of a plurality of motion vectors) exceeds a threshold (228). Alternatively, motion detection unit 44 may add up the number of motion vectors that exceed a magnitude threshold, and determine whether the number exceeds a threshold.

When motion detection unit 44 determines that an threshold has not been exceeded ("NO" branch of 228), motion detection unit 44 determines that no fast motion or scene change has occurred. In this case, motion detection unit 44 uses the next frame as the reference frame (i.e., replaces the reference frame with the frame following the reference frame), receives a subsequent frame and compares the subsequent frame to the new reference frame. However, when motion detection unit 44 determines that the threshold has been exceeded ("YES" branch of 228), either by a single motion vector magnitude, an average motion vector magnitude, or a number of plurality of motion vector magnitudes, motion detection unit 44 determines that fast motion or scene change has occurred. In this case, motion detection unit 44 triggers recording (230), in which case the pre-trigger and post-trigger video data from the buffer is encoded and stored in a data storage device.

Figure 10:
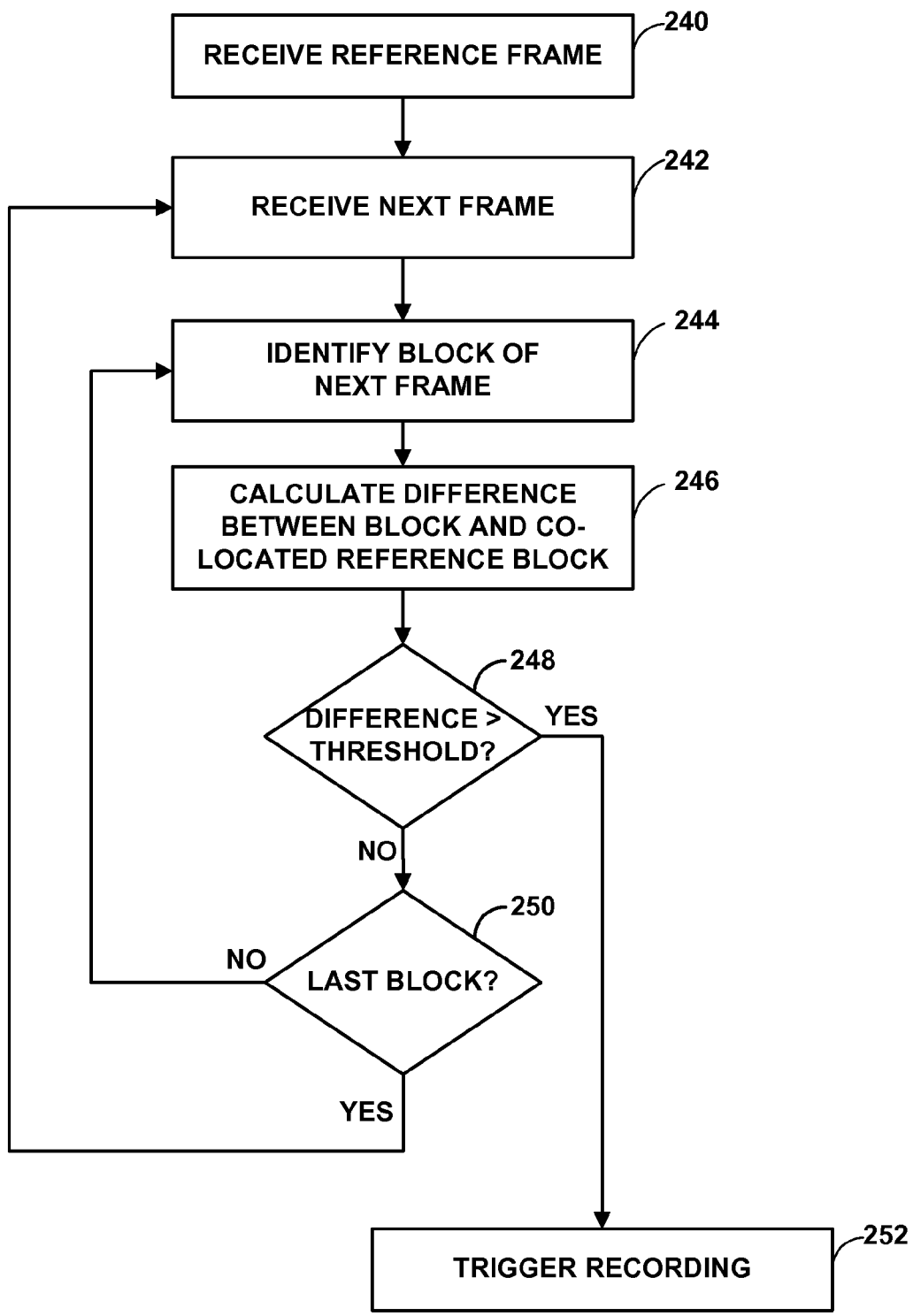
FIG. 10 is a flowchart illustrating another example method for detecting motion or scene change between video frames based on difference data.

FIG. 10 is a flowchart illustrating another example method for detecting motion or scene change between two video frames in order to trigger recording using differences between co-located blocks of two consecutive frames. The method of FIG. 10 may generally correspond to step 208 of FIG. 8, in one example. Initially, motion detection unit 44 receives a reference frame (240) and a frame following the reference frame (242), the frame following the reference frame being referred to as the "next frame." The reference frame and the next frame may comprise video frames in video buffer 40. Rather than actually receiving the frames, motion detection unit 44 may receive identifiers of memory locations of the consecutive frames in video buffer 40.

Motion detection unit 44 identifies a block of the next frame (244), for example, a first macroblock or luma block. The location of the block may be referenced by a corner pixel of the block, such as the upper-left pixel of the block. Motion detection unit 44 calculates a difference between the identified block of the next frame and a co-located block of the reference frame (246). That is, motion detection unit 44 calculates a difference between the identified block of the next frame and the block of the reference frame that begins at the same corner pixel. To calculate a value for the difference, motion detection unit 44 may, for example, calculate SAD, SSD, MAD, MSD, or other difference calculations.

Motion detection unit 44 then determines whether the difference between the two co-located blocks of the consecutive frames exceeds a minimum value, i.e., a threshold value (248). When the difference value does not exceed the threshold, motion detection unit 44 determines whether more blocks of the next frame remain to be examined (250), and when there are more blocks, motion detection unit 44 calculates a difference between another block of the next frame and the co-located block of the reference frame. When no co-located blocks between the reference frame and the next frame yield a difference in excess of the threshold ("YES" branch of 250), motion detection unit 44 determines that no fast motion or scene change has occurred in the next frame and replaces the reference frame with the next frame and retrieves a subsequent frame for comparison to attempt to identify fast motion.

When motion detection unit 44 determines that the difference value for two co-located blocks does exceed the threshold ("YES" branch of 248), however, motion detection unit 44 determines that fast motion or scene change has occurred in the next frame. Therefore, motion detection unit 44 triggers recording (252). In some examples, motion detection unit 44 determines that fast motion has occurred in the next frame only when a certain number of differences for a plurality of blocks exceeds the threshold, e.g., that at least N (N>1) blocks must have difference values above the threshold. In other cases, motion detection unit 44 may analyze a difference metric on an entire frame basis, instead of block-by-block, and detect motion when the difference metric for two frames exceeds a threshold.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

For each implementation, techniques described in this disclosure may be performed by a digital video coding hardware apparatus, whether implemented in part by hardware, firmware and/or software.

Various examples have been described. These and other examples are within the scope of the following claims.

The invention claimed is:

1. A video recording method comprising:
   buffering digital video data captured by a video sensor in a video data buffer;
   detecting motion or a scene change in the buffered digital video data;
   in response to the detection of the motion or the scene change, recording at least a portion of the buffered digital video data, as buffered before the motion or the scene change was detected, to a data storage device separate from the video data buffer; and
   in response to the detection of the motion or the scene change, recording digital video data captured after the detection of the motion or the scene change by the video sensor to the data storage device,
   wherein recording the at least a portion of the buffered digital video data and recording newly captured digital video data comprises:
      encoding the buffered digital video data and the newly captured digital video data; and
      storing the encoded digital video data in the data storage device.

2. The method of claim 1, wherein buffering digital video data comprises buffering a sufficient number of frames of the digital video data to support at least one second of video playback time.

3. The method of claim 1, wherein detecting motion or a scene change in the buffered digital video data comprises:
   generating motion vector data indicating motion between at least a portion of one frame of the buffered digital video data and at least a portion another frame of the buffered digital video data; and
   detecting motion or a scene change based on the motion vector data.

4. The method of claim 1, wherein detecting motion or a scene change in the buffered digital video data comprises:
   generating pixel difference data indicating pixel difference between at least a portion of one frame of the buffered digital video data and at least a portion of another frame of the buffered digital video data; and
   detecting motion or a scene change based on the pixel difference data.

5. The method of claim 1, wherein detecting motion or a scene change in the buffered digital video data comprises:
   encoding the buffered digital video data with an encoder;
   receiving motion vector data from the encoder; and
   detecting motion or a scene change based on the motion vector data.

6. The method of claim 1, wherein buffering digital video data comprises buffering the digital video data in a fast frame mode, recording at least a portion of the buffered digital video data comprises recording at least a portion of the buffered digital video data in the fast frame mode, and recording newly captured digital video data comprises recording newly captured digital video data in the fast frame mode.

7. The method of claim 6, wherein the fast frame mode specifies at least one of buffering and recording at a fast frame rate of greater than thirty frames per second.

8. The method of claim 6, wherein the fast frame mode specifies at least one of buffering and recording at a fast frame rate of at least sixty frames per second.

9. The method of claim 6, further comprising selecting the fast frame mode in response to user input.

10. A video recording apparatus comprising:
a video sensor that captures digital video data;
a video data buffer that buffers the captured digital video data;
a data storage device separate from the video data buffer;
a detection unit that detects motion or a scene change in the buffered digital video data;
a video recording unit that records, in response to the detection of motion or a scene change, at least a portion of the buffered digital video data, as buffered in the video data buffer before the motion or the scene change was detected, to the data storage device and records, in response to the detection of motion or a scene change, digital video data captured after the detection of the motion or the scene change by the video sensor to the data storage device; and
a video encoder, wherein the video recording unit directs the video encoder to encode the buffered digital video data and a newly captured digital video data, and store the encoded digital video data in the data storage device.

11. The apparatus of claim 10, wherein the video buffer is configured to buffer a sufficient number of frames of the digital video data to support at least one second of video playback time.

12. The apparatus of claim 10, wherein the detection unit generates motion vector data indicating motion between at least a portion of one frame of the buffered digital video data and at least a portion another frame of the buffered digital video data, and detects motion or a scene change based on the motion vector data.

13. The apparatus of claim 10, wherein the detection unit generates pixel difference data indicating pixel difference between at least a portion of one frame of the buffered digital video data and at least a portion of another frame of the buffered digital video data, and detects motion or a scene change based on the pixel difference data.

14. The apparatus of claim 10, further comprising a video encoder that encodes the buffered digital video data captured by the video sensor, wherein the motion detection unit receives motion vector data from the encoder, and detects motion or a scene change based on the motion vector data.

15. The apparatus of claim 10, wherein the apparatus comprises a wireless communication device.

16. The apparatus of claim 10, wherein the apparatus comprises one or more integrated circuit devices that implement the video data buffer, the detection unit, and the video recording unit.

17. The apparatus of claim 10, wherein the video sensor captures the digital video data in a fast frame mode, the video recording unit records at least a portion of the buffered digital video data in the fast frame mode, and records the newly captured digital video data in the fast frame mode.

18. The apparatus of claim 17, wherein the fast frame mode specifies at least one of buffering and recording at a fast frame rate of greater than thirty frames per second.

19. The apparatus of claim 17, wherein the fast frame mode specifies at least one of buffering and recording at a fast frame rate of at least sixty frames per second.

20. The apparatus of claim 17, further comprising a user input device to receive user input specifying selection of the fast frame mode.

21. A video recording apparatus comprising:
means for buffering digital video data captured by a video sensor in a video data buffer;
means for detecting motion or a scene change in the buffered digital video data;
means for recording, in response to the detection of motion or a scene change, at least a portion of the buffered digital video data, as buffered before the motion or the scene change was detected, to a data storage device separate from the means for buffering the digital video data; and
means for recording, in response to the detection of motion or a scene change, digital video data captured after the detection of the motion or the scene change by the video sensor to the data storage device,
wherein the means for recording the at least a portion of the buffered digital video data and recording newly captured digital video data comprises:
means for encoding the buffered digital video data and the newly captured digital video data; and
means for storing the encoded digital video data in the data storage device.

22. The apparatus of claim 21, wherein the means for buffering digital video data comprises means for buffering a sufficient number of frames of the digital video data to support at least one second of video playback time.

23. The apparatus of claim 21, wherein the means for detecting motion or a scene change in the buffered digital video data comprises:
means for generating motion vector data indicating motion between at least a portion of one frame of the buffered digital video data and at least a portion of another frame of the buffered digital video data; and
means for detecting motion or a scene change based on the motion vector data.

24. The apparatus of claim 21, wherein the means for detecting motion or a scene change in the buffered digital video data comprises:
means for generating pixel difference data indicating pixel difference between at least a portion of one frame of the buffered digital video data and at least a portion of another frame of the buffered digital video data; and
means for detecting motion or a scene change based on the pixel difference data.

25. The apparatus of claim 21, wherein the means for detecting motion or a scene change in the buffered digital video data comprises:
means for encoding the buffered digital video data with an encoder;
means for receiving motion vector data from the encoder; and
means for detecting motion or a scene change based on the motion vector data.

26. The apparatus of claim 21, wherein the means for buffering digital video data comprises means for buffering the digital video data in a fast frame mode, the means for recording at least a portion of the buffered digital video data comprises means for recording at least a portion of the buffered digital video data in the fast frame mode, and the means recording newly captured digital video data comprises means for recording newly captured digital video data in the fast frame mode.

27. The apparatus of claim 26, wherein the fast frame mode specifies at least one of buffering and recording at a fast frame rate of greater than thirty frames per second.

28. The apparatus of claim 26, wherein the fast frame mode specifies at least one of buffering and recording at a fast frame rate of at least sixty frames per second.

29. The apparatus of claim 26, further comprising means for selecting the fast frame mode in response to user input.

30. A non-transitory computer-readable medium encoded with instructions for causing a programmable processor to:
- buffer digital video data captured by a video sensor in a video data buffer;
- detect motion or a scene change in the buffered digital video data;
- in response to the detection of motion or a scene change, record at least a portion of the buffered digital video data as buffered before the motion or the scene change was detected to a data storage device separate from the video data buffer; and
- in response to the detection of motion or a scene change, record digital video data captured after the detection of the motion or the scene change by the video sensor in the data storage device,
- wherein the instructions that cause the processor to record the at least a portion of the buffered digital video data and record newly captured digital video data comprises instructions to cause the processor to:
  - encode the buffered digital video data and the newly captured digital video data; and
  - store the encoded digital video data in the data storage device.

31. The non-transitory computer-readable medium of claim 30, wherein the instructions cause the processor to buffer digital video data comprises buffering a sufficient number of frames of the digital video data to support at least one second of video playback time.

32. The non-transitory computer-readable medium of claim 30, wherein the instructions that cause the processor to detect motion or a scene change in the buffered digital video data comprise instructions that cause the processor to:
- generate motion vector data indicating motion between at least a portion of one frame of the buffered digital video data and at least a portion of another frame of the buffered digital video data; and
- detect motion or a scene change based on the motion vector data.

33. The non-transitory computer-readable medium of claim 30, wherein the instructions that cause the processor to detect motion or a scene change in the buffered digital video data comprise instructions that cause the processor to:
- generate pixel difference data indicating pixel difference between at least a portion of one frame of the buffered digital video data and at least a portion of another frame of the buffered digital video data; and
- detect motion or a scene change based on the pixel difference data.

34. The non-transitory computer-readable medium of claim 30, wherein the instructions that cause the processor to detect motion or a scene change in the buffered digital video data comprise instructions that cause the processor to:
- encode the buffered digital video data with an encoder;
- receive motion vector data from the encoder; and
- detect motion or a scene change based on the motion vector data.

35. The non-transitory computer-readable medium of claim 30, further comprising instructions to cause the processor to buffer the digital video data in a fast frame mode, record at least a portion of the buffered digital video data in the fast frame mode, and record the newly captured digital video data in the fast frame mode.

36. The non-transitory computer-readable medium of claim 35, wherein the fast frame mode specifies at least one of buffering and recording at a fast frame rate of greater than thirty frames per second.

37. The non-transitory computer-readable medium of claim 35, wherein the fast frame mode specifies at least one of buffering and recording at a fast frame rate of at least sixty frames per second.

38. The non-transitory computer-readable medium of claim 35, further comprising instructions to cause the processor to select the fast frame mode in response to user input.

* * * * *